United States Patent [19]
Lau

[11] Patent Number: 6,101,500
[45] Date of Patent: Aug. 8, 2000

[54] SYSTEM AND METHOD FOR MANAGING OBJECTS IN A HIERARCHICAL DATA STRUCTURE

[75] Inventor: To-Choi Lau, San Jose, Calif.

[73] Assignee: Novell, Inc., Provo, Utah

[21] Appl. No.: 09/003,859

[22] Filed: Jan. 7, 1998

[51] Int. Cl.[7] .................................................. G06F 17/30
[52] U.S. Cl. ................................ 707/103; 709/223
[58] Field of Search .......................... 707/103; 395/500; 709/223

[56] References Cited

U.S. PATENT DOCUMENTS

| | | | |
|---|---|---|---|
| 5,414,812 | 5/1995 | Filip | 707/103 |
| 5,471,399 | 11/1995 | Tanaka | 395/500 |
| 5,504,921 | 4/1996 | Dev | 709/223 |
| 5,819,028 | 10/1998 | Manghirmalani et al. | 714/57 |
| 5,845,254 | 12/1998 | Lockwood et al. | 705/2 |
| 5,878,431 | 3/1999 | Potterveld | 707/103 |
| 5,919,248 | 7/1999 | Kahkoska et al. | 709/224 |
| 5,926,463 | 7/1999 | Ahearn et al. | 370/254 |
| 6,006,016 | 12/1999 | Faigon et al. | 714/48 |

OTHER PUBLICATIONS

Computer Associates:Unicenter TNG Technical Backgrounder Press Release downloaded from the Internet—http://www.cai.com/press/97jan/tngtechb.htm, downloaded Apr., 1997.

Computer Associates:selected Unicenter TNG Questions and Answers Press Release downloaded from the Internet—http://www.cai.com/press/97jan/tngqa3.htm downloaded Apr., 1997.

Enterprise Management: Configuration Whitepaper Enterprise Management: Operations/Automation Systems Product Direction downloaded from the Internet—http://www.cai.com/products/entman/auto.htm downloaded Apr., 1997.

Concord Communications Health Index downloaded from http://www.concord.com/hlthindx.htm downloaded Apr., 1997.

Concord Communications Router Problems "Average Health Index" downloaded from http://www.concord.com/whhi.htm downloaded Apr., 1997.

Concord Communications Hourly Health Index downloaded from http://www.concord.com/trak3.htm downloaded Apr., 1997.

(List continued on next page.)

*Primary Examiner*—Wayne Amsbury
*Attorney, Agent, or Firm*—Cesari and McKenna, LLP

[57] ABSTRACT

A system for managing objects in a hierarchial structure, the system being implemented preferably in a network management program. The system determines a composite index for a network object in the hierarchical structure from one or more parameters. In addition, the system determines composite indices for parent objects based on composite indices for child objects. Preferably, parameters are based on a scale common to all objects. Parameters are defined in the range of zero to one inclusively. Multiple composite indices for an object may be determined and combined with multiple indices of other objects at a same level of the hierarchical structure to determine multiple composite indices for parent objects. Alternatively, multiple composite indices may be combined to determine an overall state index for a parent object. Further, multiple composite indices may be determined for a root object of the hierarchical structure. The system determines a next index value in time for an object based on past values of the index and a presently calculated value. Preferably, the system implements a memory effect whereby high index values are maintained longer than low index values. The system presents an indicator associated with a network to a network administrator. The indicator preferably is a flag having a color and showing the composite index for the network object. The color of the flag indicates a level of one or more properties of the object, and the index represents a degree of confidence that the object is at that level.

30 Claims, 13 Drawing Sheets

OTHER PUBLICATIONS

Concord Communications—Products downloaded from http://www.concord.com/products.htm downloaded May, 1997.

Concord Communications Network Health V2.5 "Network Health Daily LAN Report" downloaded from http://www.concord.com/except2.htm downloaded Mar., 1997.

Seagate Software, Network and Systems Management Group, Seagate NerveCenter Pro (for UNIX), 5 pp., downloaded from http://www.sems.com/Products/West/. . . Nervecenter.html1#provides_scalable dated Feb. 28, 1997.

Bay Networks, Inc., Network Management, Data Sheet, Optivity Enterprise dated 1995.

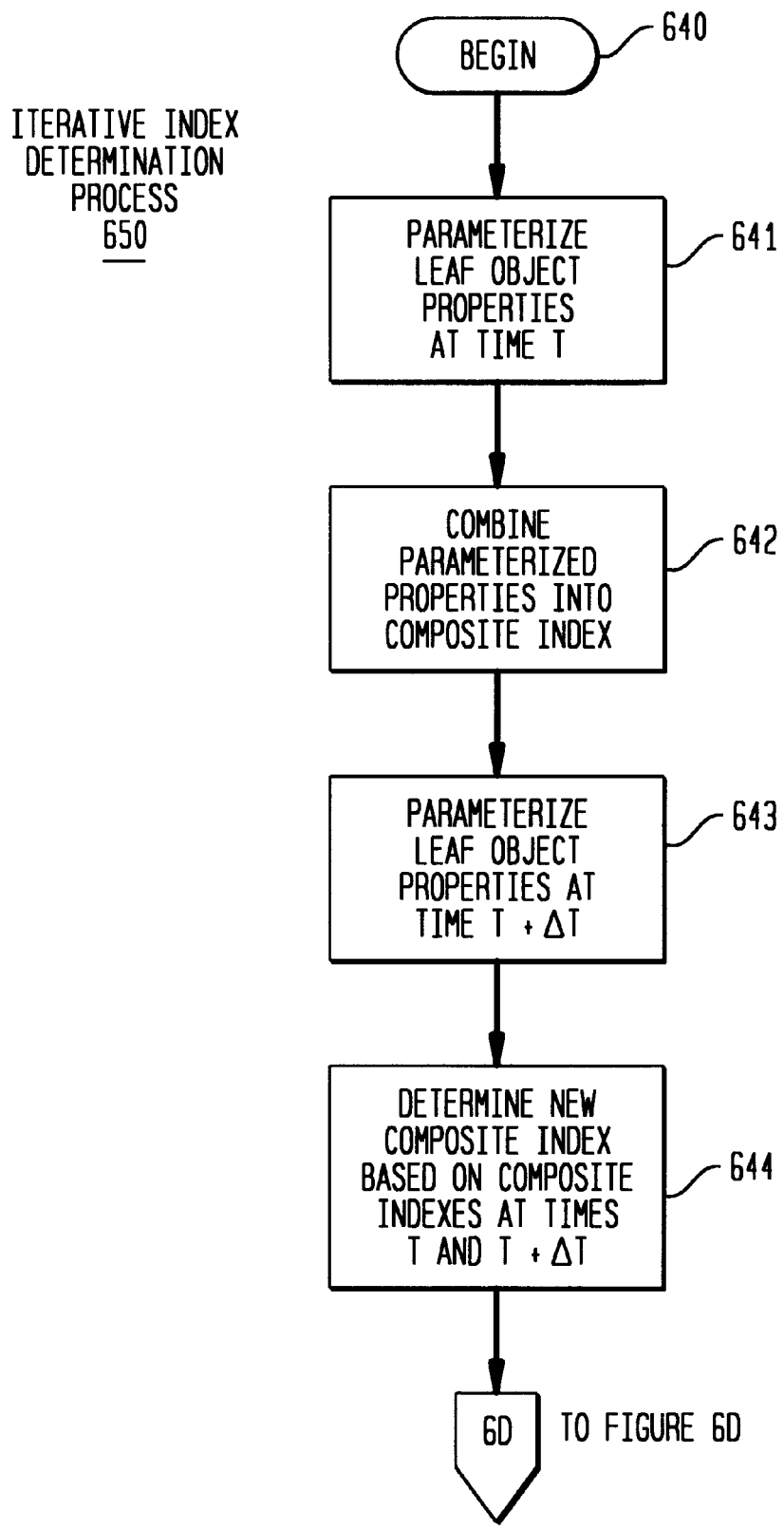

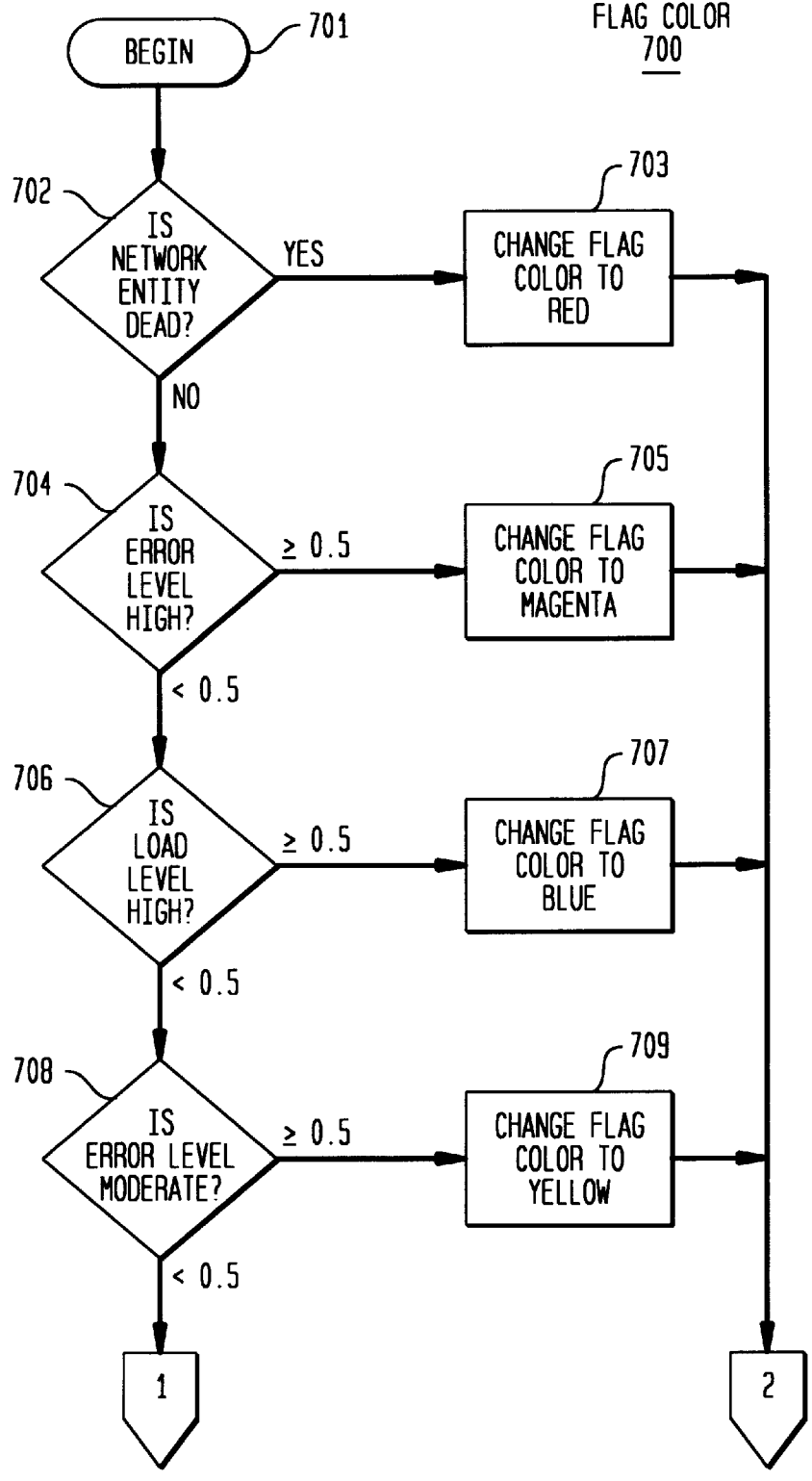

SYSTEM AND METHOD FOR MANAGING OBJECTS IN A HIERARCHICAL DATA STRUCTURE

BACKGROUND OF THE INVENTION

1. Field Of The Invention

The present invention relates generally to network management systems and, more particularly, to network management systems that manage objects arranged in a hierarchical structure.

2. Related Art

Network management is commonly defined as the process of controlling a communications network to maximize the efficiency and productivity of the network. A communications network may include a number of network entities or nodes, a number of interconnecting links and communication devices. A node may be, for example, a network node such as a personal computer, a network printer, file server or the like. An interconnecting link may be, for example, an Ethernet, Token-Ring or other type network link, while the associated communication devices may include routers, switches, bridges or their equivalents. As computer networks have grown in size, network management systems that facilitate the management of network entities, communication links and communication devices have become necessary tools for a network administrator.

A network management system typically includes a computer system or node on a communications network that executes what is generally referred to as a network management program. A network administrator uses such a network management program to primarily manage network entities. The network management program typically presents one or more maps of the network to the network administrator within a graphical user interface and includes a number of different tools for managing the network entities. An example of such a network management program is the ManageWise® network management program available from Novell, Incorporated, Orem, Utah. The ManageWise network management program provides centralized management of NetWare® servers and NetWare and IntranetWare® clients. The ManageWise network management program provides information concerning NetWare server configuration, memory allocation and processor usage, and manages devices such as servers and routers through the Simple Network Management Protocol (SNMP) and NetWare Core Protocol (NCP)™, and client machines through the Desktop Management Task Force (DMTF) management interface (Desktop Management Interface (DMI)), (ManageWise, NetWare and IntranetWare are registered trademarks, and NetWare Core Protocol is a trademark of Novell, Incorporated). SNMP, NCP, and DMI are all well known in the art of network management.

The ManageWise network management program is generally used by a network administrator to specifically manage Novell networks. A Novell network includes NetWare and IntranetWare clients, NetWare servers, and other network nodes capable of communicating using the well-known NCP. NCP defines the services available to nodes which participate in the Novell network. Such services include file access, file locking, security, NetWare directory services, communication and connection, print services, queue management, and network management, among others. ManageWise may also be used to manage networks using SNMP as discussed below.

Network entities can be arranged in a hierarchical structure as objects to provide for more efficient management of the devices. For example, related objects may be grouped into a container object such as a folder. In the case of a large network, some network management programs allow a user to create folder or container objects representing sites, buildings, group, or other meaningful organizational entities. The user can then place an object representing the network entity in a location folder object to identify the location of the network entity. Other objects such as a relational database may inherently possess a hierarchical structure which can be reproduced in the network management program.

One database having such a hierarchical structure is the Novell Directory Services® (NDS) database by Novell Incorporated (Novell Directory Services is a registered trademark of Novell, Incorporated). The NDS provides a single logical view of all network services and resources in a Novell network. Also, the NDS database is globally distributed to multiple network nodes to provide clients access to network resources regardless of where the client is located. Specifically, the NDS database organizes objects of a hierarchical directory tree. Objects of the directory tree could include printers, users, servers and the like. As discussed above, folder objects may be created by a network administrator to organize objects of the directory tree. The hierarchical directory tree is used by the network administrator to add, delete, and otherwise manage objects in the network. In particular, the ManageWise network management program may be used by a network administrator to administer NDS objects.

The network administrator typically uses a graphical map to manually navigate through a hierarchical structure such as an NDS tree, to locate a problematic object; that is, an object that is behaving in such a manner to adversely impact network performance. Also, the network management program enters errors or traps in a log file, usually in the order of occurrence, for later review by the network administrator. Typically, the network management program makes entries in the log file when a trap is received by the network management program or when a statistical value in the network management program exceeds a threshold value. In conventional systems, and icon is often used to represent the network object. When an error is encountered, a characteristic of the icon, such as its color, is altered. The network administrator is then required to obtain additional information regarding the network object through the network management program to determine the status of the device and the source of the error. The network administrator must manually sift through the list of errors in the log file to locate the error that leads to the object that caused the errors. In this case, the network administrator must have prior knowledge of troubleshooting techniques for the network object at issue, and thus must know what data to observe from the network object. Also, because the network object interacts with other network objects, the network administrator must analyze a considerable quantity of data related to other network objects as well.

A concept of network object health is a recent development to simplify network management for the network administrator. Network health is a method of combining indicators into a single "health" value for a network object. An index representing the health of the Network Object is computed, usually having a numeric value having an associated color in which an icon representing the network object in the network management program is rendered. For a network object, multiple variables typically are monitored on a network management station. These variables have certain ranges, over which, the variables can have particular values. For example, for a network object such as a file server, the file server may have a indicator corresponding to the percent utilization of the processor that may take a value between zero and one hundred percent. For a particular type of network object, its overall health may be determined by a number of indicators such as percent utilization of the processor and other factors. By determining a health index for overall health, the amount of information that must be processed by the network administrator is reduced.

One conventional network management program utilizing such a health index is the Network Health network management program from Concord Communications. The Network Health network management program assigns fixed grades for each indicator value and assigns ranges for each grade. The grades for each indicator contributing to an overall health index are added together to determine the health index for a particular network object. For example, an excellent health grade would be given a grade of 0, a good health grade receives a grade of 2, a fair grade receives a grade of 4, and a poor grade receives a grade of 8. In the case of the determining the utilization of a link, a utilization range between 0 and 10% is given an excellent grade, between 10% and 20% a good grade, between 20 and 35% a fair grade and a utilization over 35% a poor grade. If, for example, a network object's utilization was 15%, the network object would receive a good grade for utilization, and thus receives a utilization health index of 2. The utilization health index may be combined with a number of other indices to determine an overall health index for a particular network object.

In the Network Health Network Management program, a network object is likely experiencing some type of problem when a health index has a value greater than a predetermined threshold value. Also, elements with a high health index may be problematic and should be investigated. However, a drawback to the Network Health network management program is that it may overestimate or underestimate problems for certain devices due to predetermined threshold values. If the defined range of values is underestimated, that is, threshold levels are set low relative to actual network conditions, numerous unnecessary error entries will be entered in the error log file. If overestimated, problems with network objects go undetected. Another drawback is that the network administrator is required to change the defined range of values for each variable used to calculate the health index to account for differences between various types of network objects. This requires the network manager to have prior knowledge of the type and scope of potential problems to adjust the levels of the health index. Typically, network administrators are not completely familiar with every network object, and thus do not have the requisite experience to properly adjust levels of the health index. As a result, the above overestimation and underestimation problems regularly occur.

Further, conventional network management programs that compute a health index determine a health index value that is not on a standard scale. That is, a health index for one object type may have index value ranges that are different than the same health index for another type of object. Thus, it becomes more difficult for a network administrator to identify objects experiencing a problem when comparisons between objects are not standardized.

Also, when a problem occurs in conventional network management programs, many related alarms are often raised concurrently, masking the source of the problem. An important alarm may be buried among less important alarms, and thus the more significant or important alarms may escape the attention of the network administrator. To avoid this from occurring, the network administrator must process a number of different network indicators to arrive at a problem resolution. As a result, a heavy burden is placed on the network administrator to skillfully and diligently process the network indicator information. Furthermore, this process is time consuming. However, the network administrator needs to obtain and process information quickly, as any delay may be problematic, such as when the problem causes a loss of network service.

The above drawbacks are further magnified due to the number of entities in large networks. In such large networks, many parameters must be observed concurrently. In an NDS tree, for example, there may be many layers of objects, and thus it is inefficient for a network administrator to traverse the NDS tree structure to locate a particular problem. Also, for complex problems involving multiple objects in the NDS tree, a network administrator must look at different indicators concurrently to determine the overall problem.

What is needed, therefore, is a network management system that allows a network manager to find problems quickly without prior knowledge of the problem. In addition, a network management system that provides a network administrator with accurate information of the source of a problem object would be beneficial. Such a network management program should be able to manage a large network having numerous network objects.

SUMMARY OF THE INVENTION

The present invention relates to an apparatus and method for managing objects in a hierarchial structure, and is preferably implemented in a network management program. The present invention method determines a composite index for a network object in the hierarchical structure from one or more parameters, based on an expert judgement. Also, the present invention determines composite indices for parent objects based on indices for child objects.

According to one aspect of the present invention, a method for managing a plurality of objects arranged in a hierarchical structure is disclosed. The method includes a method for managing a plurality of objects arranged in a hierarchical structure, the steps of a) combining a first and a second parameterized property both associated with a first object in accordance with a first predetermined manner to form a composite index of the first object, wherein the composite index represents a relative health of the first object and has a standardized value range; b) combining a third and a fourth parameterized property, both associated with a second object, in accordance with a second predetermined manner to form a composite index of the second object, wherein the composite index of the second object represents a relative health of the second object and has a same standardized value range; and c) combining the composite indices of the first and second objects to obtain a first parent composite index corresponding to a parent object, wherein the first and second objects are child objects of the parent object and the first parent composite index has a value range which is the same as that of the first and second object composite indices.

Advantageously, the method of the present invention determines a composite index for a network object which does not require prior knowledge of the network object by the network administrator. The composite index represents a degree of confidence that a particular network object is experiencing a problem.

In one embodiment, the method also includes the steps of:
d) determining a second parent composite index for the parent object; and e) combining the first and second parent composite indices into a total state index for the parent object. Preferably, before said step e), the invention performs step f) of weighting the first and second indices.

In another embodiment, the method also includes the steps of: d) combining the first parent composite index with other parent composite indices at a same level of the hierarchical structure, the hierarchical structure having a root object; and e) combining, for the root object, parent composite indices to obtain a final composite index, wherein the final composite index indicates a health of the hierarchical structure. Preferably, the composite indices of the first, second, and parent objects each have a standardized range of value in the range of zero to one, inclusively, and the step c) includes 1) determining the arithmetic average of the first index, second index, and other indices of objects at a same level of the hierarchial structure.

In one embodiment, step c) includes the steps of: 1) weighting the first index by a first weighting producing a first weighted index; 2) weighting the second index by a second weighting producing a second weighted index, wherein the first weighting is different than the second weighting; and 3) arithmetically combining the first and second weighted indices.

In an alternative embodiment, the method also includes the steps of: d) determining the composite index for the first object at one moment in time; e) determining a newer composite index at a later point in time; and f) computing a next composite index based on the composite index and the newer composite index. Preferably, the next composite index is an arithmetic average of the composite index and the newer composite index.

In one embodiment, the next composite index is increased by a first fraction of a difference between squares of the composite index and the newer composite index if the newer composite index has a greater value than the composite index and wherein the next composite index is decreased by a second fraction of the difference between squares of the composite index and the newer composite index, if the newer composite index has a lesser value than the composite index. When the first fraction is greater than the second fraction, the method includes the step of providing a rising response that is faster than a proportional falling response.

In another aspect of the invention, system for managing a plurality of objects arranged in a hierarchical structure is disclosed. The system includes means for combining a first and a second parameterized property both associated with a first object in accordance with a predetermined manner to form a composite index of the first object, wherein the composite index represents a health level of the first object and has a standardized value range, means for combining a third and a fourth parameterized property both associated with a second object in accordance with a second predetermined manner to form a composite index of the second object wherein the composite index of the second object represents a relative health of the second object and has a same standardized value range, and means for combining the composite indices of the first and second objects to obtain a first parent composite index corresponding to a parent object, wherein the first and second objects are child objects of the parent object and the parent composite index has a value range which is the same as that of the first and second object composite indices.

Preferably, the composite indices of the first, second, and parent objects each have a standardized range of value in the range of zero to one inclusively, and the means for combining includes means for weighting the first index by a first weighting producing a first weighted index, means for weighting the second index by a second weighting producing a second weighted index, wherein the first weighting is different than the second weighting, and means for arithmetically combining the first and second weighted indices. Preferably, the system also includes means for determining a second parent composite index for the parent object, and means for combining the first and second parent composite indices into a total state index for the parent object. Preferably, the first and second indices are weighted before being combined into the total state index.

In one embodiment, the system also includes means for combining the first parent composite index with other parent composite indices at a same level of the hierarchical structure, and means for combining, at the top of the hierarchical structure, parent composite indices to obtain a final composite index.

In another embodiment, the system also includes means for determining the composite index for the first object at one moment in time, means for determining a newer composite index at a later point in time, and means for computing a next composite index based on the composite index and the newer composite index. Preferably, the next composite index is an arithmetic average of the composite index and the newer composite index.

In another embodiment, means for combining includes means for determining the arithmetic average of the first index, second index, and other indices of objects at a same level of the hierarchial structure.

In another embodiment, the next composite index is increased by a first fraction of a difference between squares of the composite index and the newer composite index if the newer composite index has a greater value than the composite index and wherein the next composite index is decreased by a second fraction of the difference between squares of the composite index and the newer composite index, if the newer composite index has a lesser value than the composite index. Preferably, the first fraction is greater than the second fraction, providing a rising response that is faster than a proportional falling response.

In one aspect of the invention, a network management system is disclosed. The system includes a network manager operable to retrieve at least one property value from one of a plurality of agents corresponding to a first object located in a hierarchical structure; a data correlator constructed and arranged to compute a relative health of the object based upon the at least one property value wherein the relative health of the object is represented by a first index having a standardized value range, and wherein said data correlator is operable to combine the index with a second index for a second object to produce a composite index of a parent object, the composite index having a same standardized value range as that of the first and second indices; and a graphical user interface for displaying the relative health of the network management system.

In one embodiment of the invention the data correlator includes: a state processor that determines a state of the object based on at least one object rule; and an interface processor which changes the color of an indicator based on the state of the object, the indicator being associated with the object within the graphical user interface and presenting the user with the health index of the object. In another embodiment, the state processor that determines a state of a container object based on a relative health index of at least one of a plurality of objects located at a same hierarchical level in the hierarchical structure; and an interface processor which changes the color of an indicator based on the state of the object, the indicator being associated with the container object within the graphical user interface and presenting the user with the health index of the container object. Preferably, the interface processor generates the indicator associated with the object, and wherein the indicator is a flag containing a value of the health index. It is also preferably that the first, second, and composite indices have a value in a range from 0 to 1.

In another embodiment, the interface processor generates the indicator associated with the object, and wherein the indicator is a flag containing a value of the health index.

In still another aspect of the invention, a controller for enabling a processor to manage network objects in a hierarchical structure. The controller includes a network manager for retrieving at least one property value from one of a plurality of agents corresponding to an object located in a hierarchical structure, and a data correlator for computing relative health of the object based upon the at least one property value wherein the relative health of the object is represented by a first index having a standardized value range, and for combining the index with a second index for a second object to produce a composite index of a parent object, the composite index having a standardized range that is the same as the standardized range of the first and second indices.

In still another aspect of the invention, a computer program product comprising a computer readable medium having computer program logic recorder thereon for enabling a processor in a network management system to manage objects in a hierarchical structure, said computer program product comprising, a network manager for retrieving at least one property value from one of a plurality of agents corresponding to an object located in a hierarchical structure, and a data correlator for computing relative health of the object based upon the at least one property value wherein the relative health of the object is represented by a first index having a standardized value range, and for combining the index with a second index for a second object to produce a composite index of a parent object, the composite index having a standardized range that is the same as the standardized range of the first and second indices.

Further features and advantages of the present invention as well as the structure and operation of various embodiments of the present invention are described in detail below with reference to the accompanying drawings. In the drawings, like reference numerals indicate identical or functionally similar elements. Additionally, the left-most one or two digits of a referenced numeral identifies the drawing in which the reference numeral first appears.

BRIEF DESCRIPTION OF THE DRAWINGS

This invention is pointed out with particularity to the appended claims. The above and further advantages of this invention may be better understood by referring to the following detailed description when taken in conjunction with the accompanying drawings, in which:

FIGS. 6A–6D are flow charts of one embodiment of a health index calculation procedure of the present invention; and FIGS. 7A–7B are flow charts showing an exemplary process for determining a health index flag color in accordance with one embodiment of the present invention.

DETAILED DESCRIPTION

Figure 1:
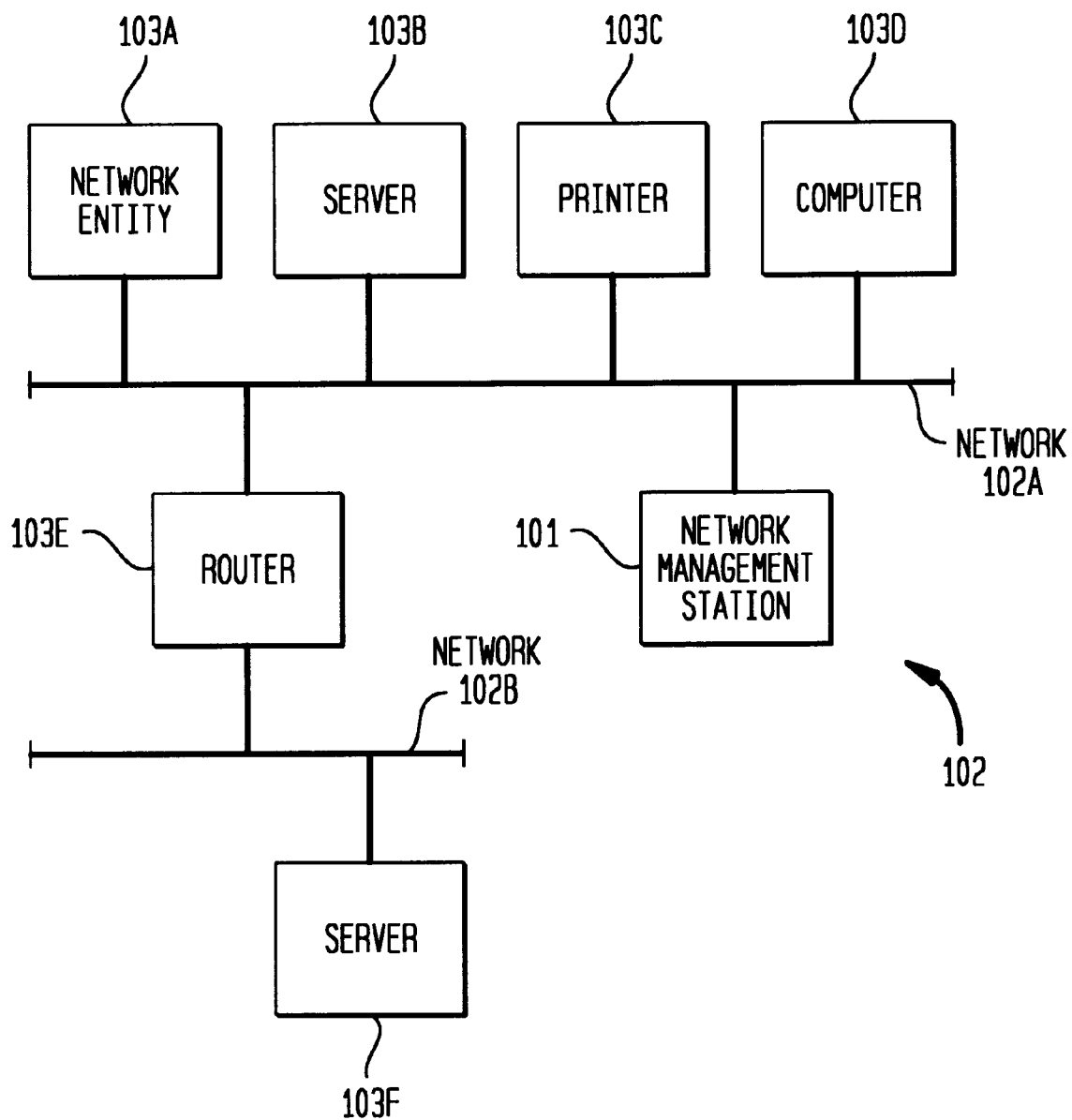
FIG. 1 is a block diagram of a network wherein the present invention may be implemented.

The management method of the present invention may be implemented in any system architecture from a stand-alone computer system such as a personal computer, to a server or client node of a distributed network. FIG. 1 illustrates an exemplary distributed network environment in which the management method of the present invention may be implemented.

In the illustrative network environment, one embodiment of the invention may be implemented on a network management station 101 connected to a distributed network 102. The distributed network 102 may include one or more subnetworks 102A, 102B connected with an internetworking device such as router 103E. Attached to the distributed network 102 are network entities or devices. The network entities may include a server 103B, a printer 103C, a computer 103D and the router 103E. These devices are generally and collectively referred to as network entities 103. In the portion of the exemplary network illustrated in FIG. 1, the network management station 101 typically manages the network entities 103 using a network management protocol. One such network management protocol is the Simple Network Management Protocol (SNMP). SNMP is considered to be well known in the art of network management. It is noted that many other network management protocols may be used by network management station 101.

Using the network management protocol, the network management station 101 actively polls network entities 103 to determine information settings, change the configuration or perform an action on the network entities 103. In general, the network management station 101 either obtains information from, or delivers information to, the network entities 103. When using SNMP, the network management station 101 executes functions that are commonly referred to in the art as set, get, or get-next functions for setting and retrieving information from a network entity. In SNMP, this information is stored in a database within a network entity referred to as a Management Information Base (MIB). The network management station 101 may also receive unsolicited information from a network entity 103. This unsolicited information is commonly referred to as an SNMP trap. Network entities 103 typically send SNMP traps to the network management station 101 when a problem in the network or device occurs.

Figure 2A:
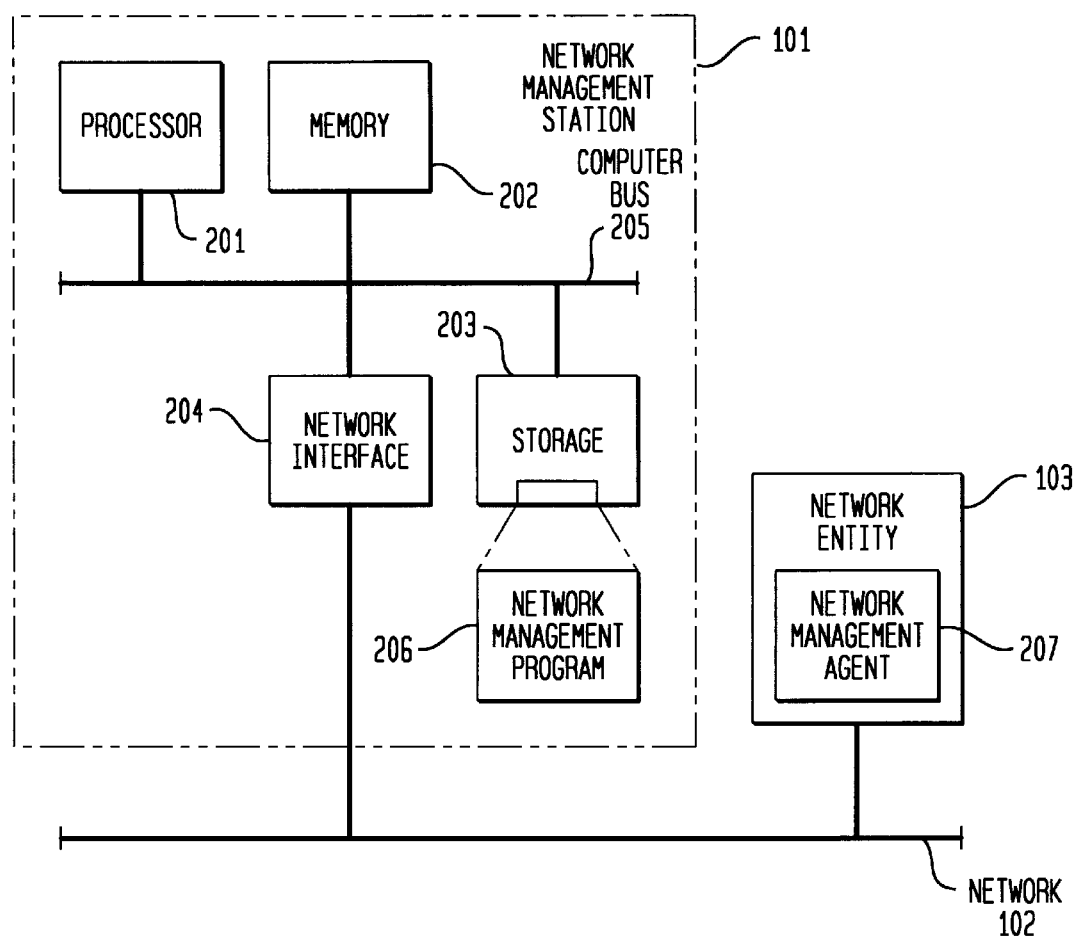
FIG. 2A is a block diagram of a network management system suitable for implementing the present invention.

FIG. 2A is a block diagram of the network management system 101 illustrated in FIG. 1. As shown in FIG. 2A, the network management station 101 may be any general purpose computer system which is programmable using a high-level computer programming language. In another embodiment, the network management station 101 may be implemented using specially programmed, special purpose hardware. The illustrative network management station 101 includes a commercially-available processor 201, such as the PENTIUM Microprocessor by the Intel Corporation, Power PC Microprocessor, SPARC Microprocessor, RISC Microprocessor or 68000 Series Microprocessor. Many other processors are also available. Such a processor 201 usually executes an operating system (not shown) which may be any well known operating system providing an operating environment for a network management program 206 implementing an embodiment of the present invention. For example, the operating system may be any one of the various versions of the Windows® and MS-DOS® operating systems from Microsoft Corporation, the UNIX Operating system available from many vendors, such as Sun Microsystems, Inc. and the Hewlett-Packard Corporation, or the NetWare or Intranet-Ware operating systems available from Novell, Incorporated (Windows and MS-DOS are registered trademarks of Microsoft Corporation, UNIX is a registered trademark in the United States licensed exclusively through X/Open Company, Ltd., NetWare and IntranetWare are registered trademarks of Novell, Incorporated). The processor 201 controls the execution of computer programs that provide scheduling, debugging, input-output control, accounting compilation, storage assignment, data management, memory management, and communication control and related services. The processor 201 and operating system define a computer platform for which application programs in high level programming languages are written.

The operating system interfaces with firmware and hardware (not shown) and a well-known manner to access memory 202, storage 203, and network interface 204. The processor 201 communicates with memory 202, storage 203, and the network interface 204 through an interconnection mechanism such as computer bus 205. Storage device 203 may store programs such as a network management program 206.

As will be explained in detail below, the present invention may be implemented in the network management program 206 or in a network management agent 207 in accordance with an embodiment of the invention. The network management program 206 is preferably configured as a generic software application capable of residing on any well-known computing platform, such as the network management station 101. Network management program 206 may be, for example, the ManageWise® management program available from Novell, Incorporated, HP OpenView® network management program available from the Hewlett-Packard Company, or the like (ManageWise is a registered trademark of Novell, Incorporated and HP OpenView is a registered trademark of the Hewlett-Packard Company). In one embodiment of the present invention, the network management program 206 is implemented in a software program written in the C++ programming language. In an alternative embodiment, the network management program is implemented in a software program written in the Java® programming language (Java is a registered trademark of Sun Microsystems, Inc.). The software routines for performing the network management functions in accordance with the present invention typically reside in memory 202 and may be stored on a computer-readable medium such as, for example, magnetic disk, compact disk, or magnetic tape, and may be loaded in the network management station 101 using an appropriate peripheral device as known in the art. It should be understood, however, that the present invention is not limited to a particular computer platform, particular operating system, particular processor, or particular program language and/or algorithm. The exemplary embodiments described herein are given by way of example only and the invention may be implemented in a variety of computer systems having a variety of system architectures.

As discussed above, network management station 101 manages one or more network entities 103. Station 101, through interface 204, communicates with a network management agent 207 residing on the network entity 103. This communication is performed typically by calling available network management functions, such as those found in SNMP. The network management agent 207 may be a software process running on a processor or may be implemented in special purpose hardware.

Figure 2B:
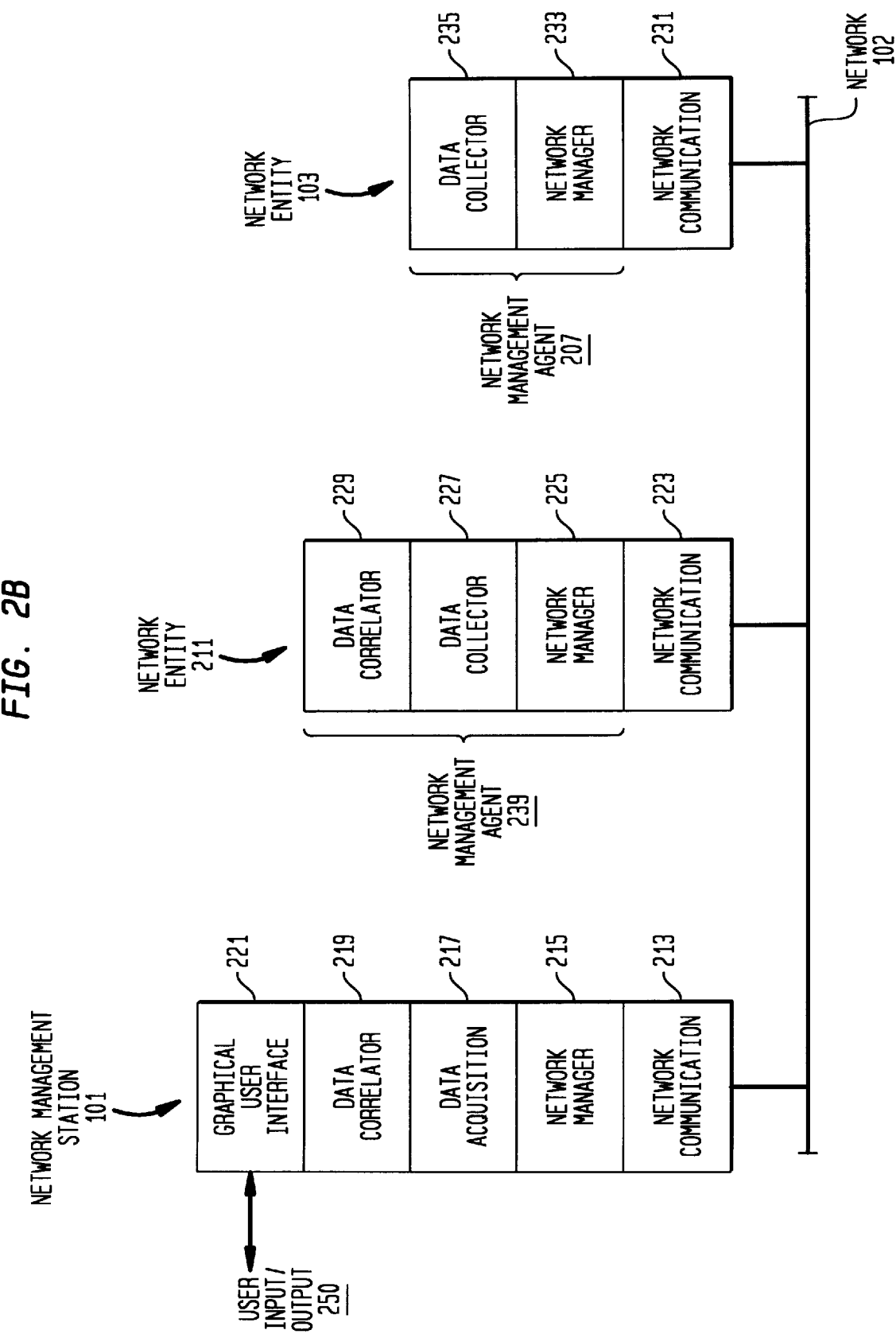
FIG. 2B is a block diagram of one embodiment of a network management station including an embodiment of the present invention.

FIG. 2B is a functional block diagram of one embodiment of a network management system configured in accordance with the present invention. The network management station 101 generally includes a network communication interface 213, a network manager 215, a data acquisition unit 217, and a graphical user interface 221. The network communication interface 213 may include transport protocols and LAN drivers used to communicate information to the network 102. Examples of suitable transport protocols include the well-known IPX and TCP/IP transport protocols, although many others may be used. LAN drivers may include software required to transmit data on network 237 through network interface 204. These LAN drivers are generally provided by the manufacturer of the network interface for the general purpose computer for the purpose of communicating through the network interface 204. Network manager 215 may be, for example, an SNMP network manager/agent implementing SNMP functions, or a NetWare manager performing network management functions through NCP. The network manager 215 uses the network communication interface 213 to transfer requests to network entities 211 and 103 on network 102.

Network entity 103 is a conventional network entity having a network management agent 207. The network management agent 207 may be an SNMP agent. Agent 207 generally includes a network manager 233 which communicates through the network communication interface 231 in the same manner as described above with respect to the network management station 210. Agent 207 also includes a data collector 235 which collects performance and configuration information from the network entity 103.

The data acquisition unit 217 is used to obtain management information from network entities 211, 103 by calling network management functions in the network manager 215. These network management functions return data to the data acquisition unit 217 where they may be stored, processed or deleted. Also, this data is typically displayed to a user 250 of the network management station 101 through a graphical user interface 221.

Figure 2C:
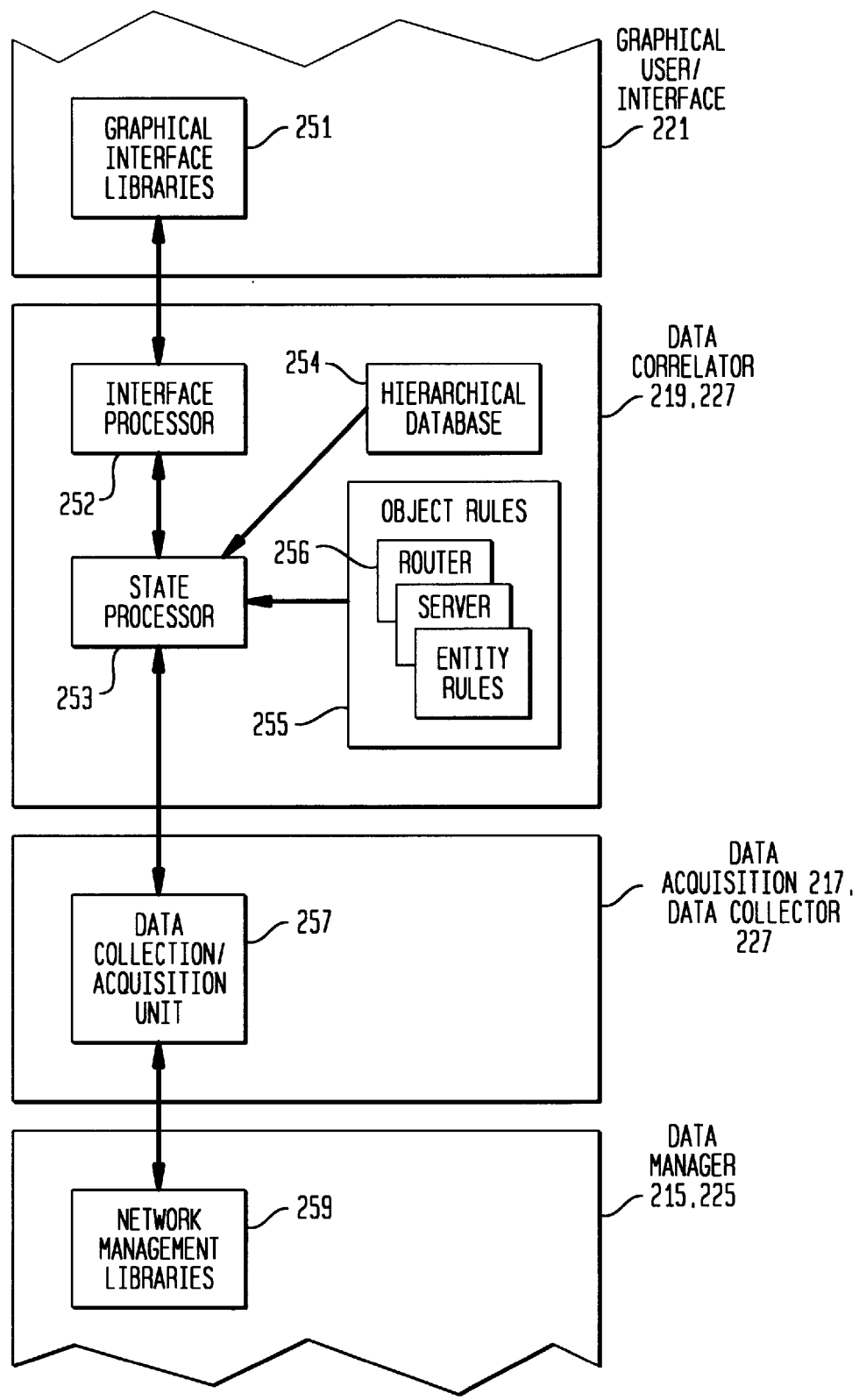
FIG. 2C is a block diagram showing one embodiment of a data correlator of the present invention.

In accordance with the present invention, the network management station 101 also includes a data correlator 219. In accordance with one embodiment of the present invention, the data correlator 219 interprets data received through the data acquisition unit 217 and presents this interpreted data to the user 250 through the graphical user interface 221. As will be explained in detail below, in an alternative embodiment, the data correlator of the present invention may also be included in a network entity 103. For example, as shown in FIG. 2B, a data correlator 229 is also included in network entity 211. On the network entity 103, the data correlator 219 interprets data received through data collector 227. For ease of description, the following discussion refers only to data correlator 219, although it applies to both data correlators 219, 229. The data correlator 219 is shown in more detail in FIG. 2C, and includes an interface processor 252, a state processor 253, a hierarchical database 254, and one or more sets of object rules 255. The interface processor 252 communicates with known graphic libraries 251 in the graphical user interface 219 to present interpreted data to the user 250. The interface processor 252 preferably performs graphic functions associated with objects in a network map, such as generating flags and their associated colors and state index. The interface processor 252 calls functions within the graphics libraries 251 according to the actions which are to be performed.

In one embodiment, the state processor 253 performs correlation functions of the data correlator 219. Specifically, the state processor 253 requests and receives network management information such as network entity performance statistics from the data acquisition unit 217 or data collector 227. The data acquisition unit 217 stores data and requests information from the network manager 215. The data collector collects data from the network entity directly through its own network manager 225. Collection processes performed by the data acquisition unit 217 and data collector 227 are performed by a data collection/acquisition unit 257. The data collection/acquisition unit 257 in turn invokes network management commands within network manager libraries 259 which send and retrieve information from the network entity 211,103. As discussed above, these commands may be SNMP get or get-next functions. The state processor 253 interprets data received from the network manager libraries 257 in accordance with object rules 255. Object rules 255 define how the state processor 253 will combine or parameterize different properties of a network entity. The state processor produces parameterized properties from the object rules 255. Because objects have different properties and different methods of parameterization, there may be different sets of rules for particular types of objects. For example, one such set of rules 256 may apply only to router objects. In another embodiment, there may also be different rules for different entities of the same type. The state processor 253 determines index information for a network entity according to the interpreted data and the object rules for the network entity, and transfers the index information to the interface processor 252 for display to the user 250.

In one embodiment of the invention, the data correlator 219 stores a model of a hierarchical database, such as an NDS database. The data correlator 219 may produce indices for objects within the database as described above, and may produce indices for folder objects or container objects as described below with reference to FIG. 3. In one preferred embodiment, the data correlator 219 is included in the network manager 215. The data correlator 219 simplifies data received from various network entities 103 into state indices arranged in the hierarchical database. Each state index includes two dimensions of data. The first dimension is the level and the second is the degree of certainty of each level. There may be many such levels associated with the state index. One such state index may indicate the "sickness" and another may indicate the "busyness" of the network entity. A sickness index would be derived from error information and would represent the overall error rate of the device. A busyness index would be derived from performance data and may indicate the overall load being placed on the device. In one preferred embodiment, these state indices are mapped into a color code for a display flag that provides a mechanism for a network administrator to quickly and easily find the most severe problem amidst a number of network entities. The network administrator does not need, therefore, prior knowledge of the problem or problems that arise; the network administrator only needs to interpret color codes (or some other recognizable indicator) displayed through the graphical user interface 219.

In another embodiment of the invention, the network entity 211 includes a network management agent 239 configured in accordance with the present invention. The agent 239 includes a data correlator 229 that allows the agent 239 to obtain and process information from a number of network entities 103 similar to network management station 101. The data correlator 229 stores state index information for retrieval by network management station 210. Because the data correlator 229 is provided at the network management agent 239 in addition to the network management station 210, some of the processing may be distributed from the station 101 to the agent 211. Thus, the network management station may poll the network entity 211 for a lesser amount of information because station 101 does not need to interpret data from entities which are being analyzed by network entity 211.

Figure 3:
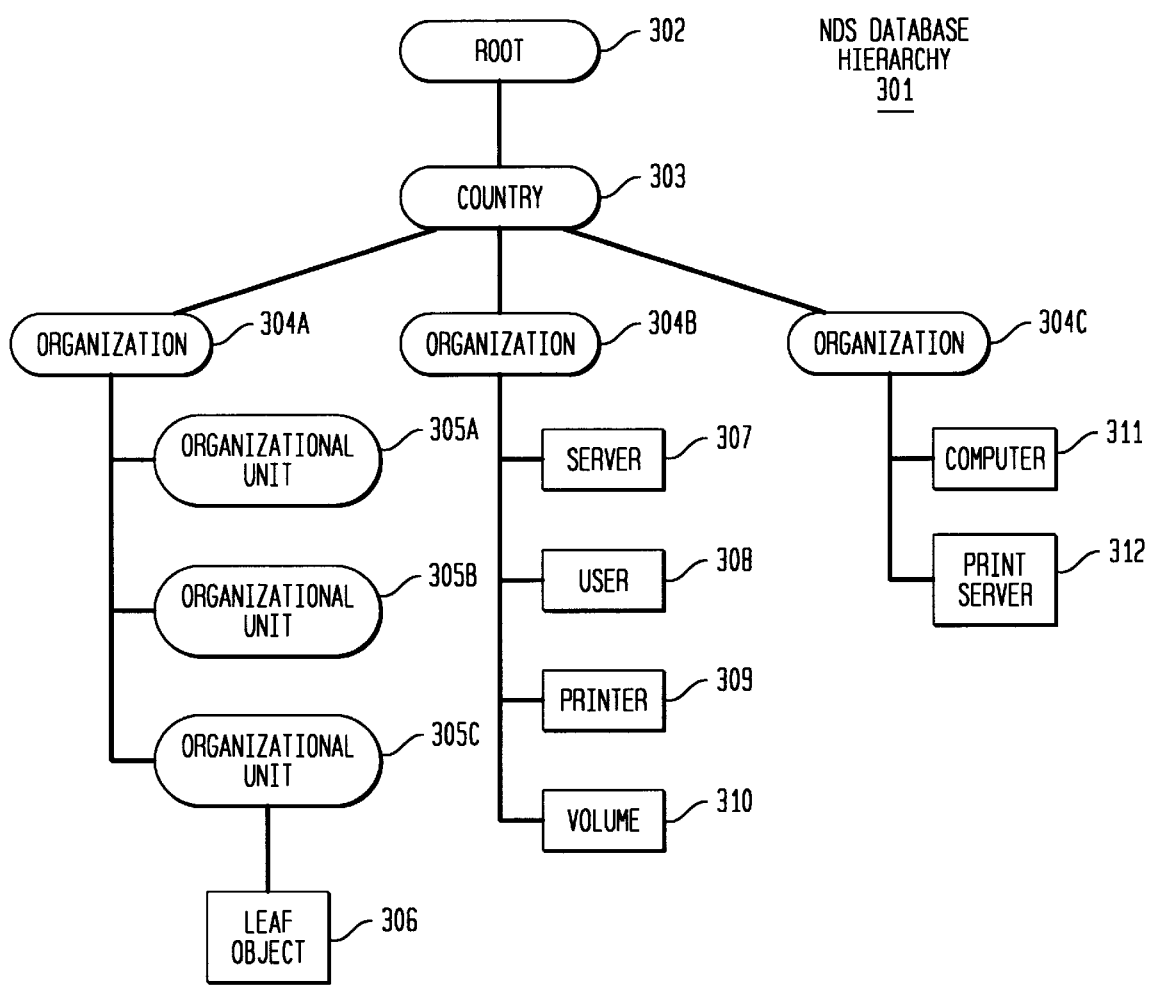
FIG. 3 is a block diagram of a hierarchical database structure.

As discussed above, an embodiment of the invention manages objects arranged in a hierarchical structure. One such structure is the object hierarchy 301 as shown in FIG. 3. The object hierarchy 301 includes a root object 302, a number of container objects 303–305, and number of leaf objects 306–312. The root object 302 is a type of container object 303 in that it can contain other objects. However, the root object 302 is the single container object located at the top of the object hierarchy 301. Container objects 303–305, also referred to as parent objects, may contain other container objects 303 or leaf objects 306–312. A container object may be, for example, a locational folder located in a graphical user interface or database of the network management program 206. Leaf objects 304 may be, for example, representations of network entities 103 such as a server 103B, printer 103C, computer 103D, or router 103E. The leaf objects 304 are generally managed by the network management program 206 by a network administrator.

Object hierarchy 301 may be created manually through a graphical user interface of the network management program 206. A network administrator may choose to organize leaf objects 306–312 (representations of network entities 103) into organizational locations or folders to create a more usable representation of the network and its objects. Also, as discussed above, some network objects themselves possess such a hierarchical structure.

Specifically, FIG. 3 shows an NDS database forming such an object hierarchy. The NDS database hierarchy 301 includes a root object 302 that is the top most object in what is commonly referred to as an NDS tree. The root object 302 provides an access point to country object 303 and organizational objects 304A–304C. The country object 303 is an optional container object that may include organizational objects 304 or alias objects (not shown) that link to other locations in the NDS tree. Organization objects 304 and organizational unit objects 305 allow a network administrator to administer different functional groups within an organization. Typically, an NDS database hierarchy 301 is modeled according to the administrative requirements of a company. As discussed above, leaf objects are network management representations of network entities 103. A network administrator will traverse the NDS database hierarchy 301 through a graphical user interface to obtain information concerning leaf objects 306–312.

Figure 4:
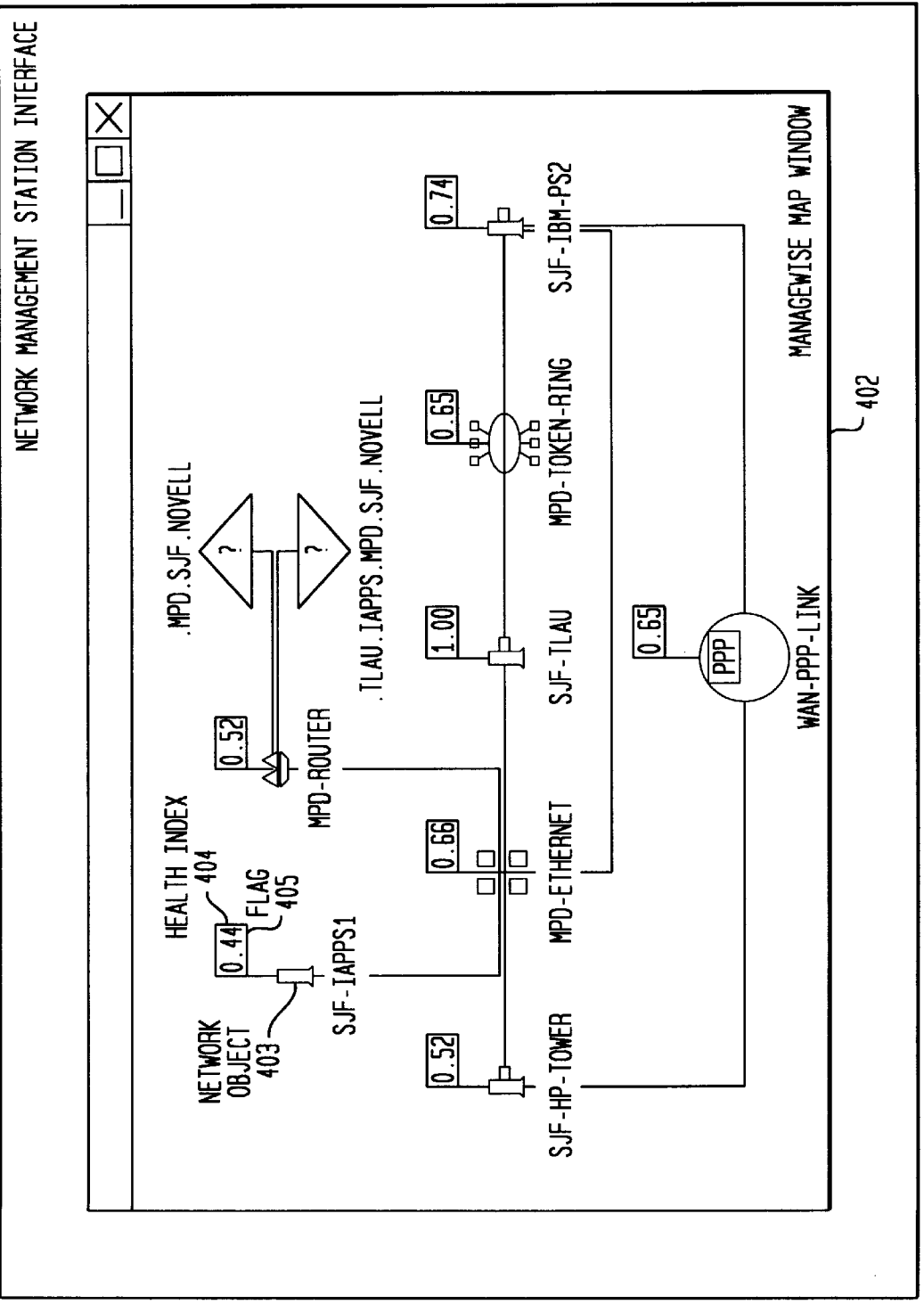
FIG. 4 is a diagram of one embodiment of a network management station interface utilizing the present invention.

FIG. 4 is a diagram of a network management station interface 401 produced by the graphical user interface 221. For the exemplary NDS database hierarchy 301, the network management program 206 is preferably the ManageWise network management program available from Novell, Inc. As discussed above, network management program 206 is executed by network management station 101. Specifically, interface 401 displays a ManageWise Network Management Program window 402 that pictorially shows network entities distributed through the network. Such a graphical user interface allows easy access to network objects, and hence network entities 103, to perform network administrative functions. As shown in FIG. 4, a network object 403 that represents a Novell File Server is connected through a communication network to other network objects. Also, the management method of the present invention described below in detail computes a health index 404 for the network object 403 having a value of 0.44. In the illustrative embodiment, the health index 404 is displayed within a graphic such as a flag 405. The flag 405 may have different colors depending on the status of the associated network object 403. The management method that provides such a health index will now be described.

One embodiment of the present invention analyzes data associated with objects arranged in a hierarchical structure. The analyzed data is presented in a manner that a network administrator can locate pertinent information without prior knowledge of the network objects or the underlying hierarchical structure. The management method of the present invention computes a composite index that represents a high level property, such as overall health, of a particular network entity 103. The composite index, such as a network health index, is calculated as a function of the values of particular properties of an object, such as processor utilization. The relationship of an object's properties to a health index is definable by the network administrator, and is preferably determined by an expert in the field of the particular network object. For example, if the object is a network server, then the operating condition of the network server can be represented by a health index. The health of a NetWare server can be measured by a set of properties selected by an expert in NetWare servers. Such a set of properties may be, for example, processor utilization and percentage of file cache misses. The method of the present invention combines values for these properties in a predetermined manner to provide, for example, a health index for a NetWare server. Thus, an expert in the field of the network object renders an expert judgement with regard to property relevance to the health index by determining how the property values are combined to form an index. Further, the expert will determine thresholds for these properties. Thresholds are particular values of properties which when exceeded, indicate that the associated object has a particular state or condition.

Figure 5A:
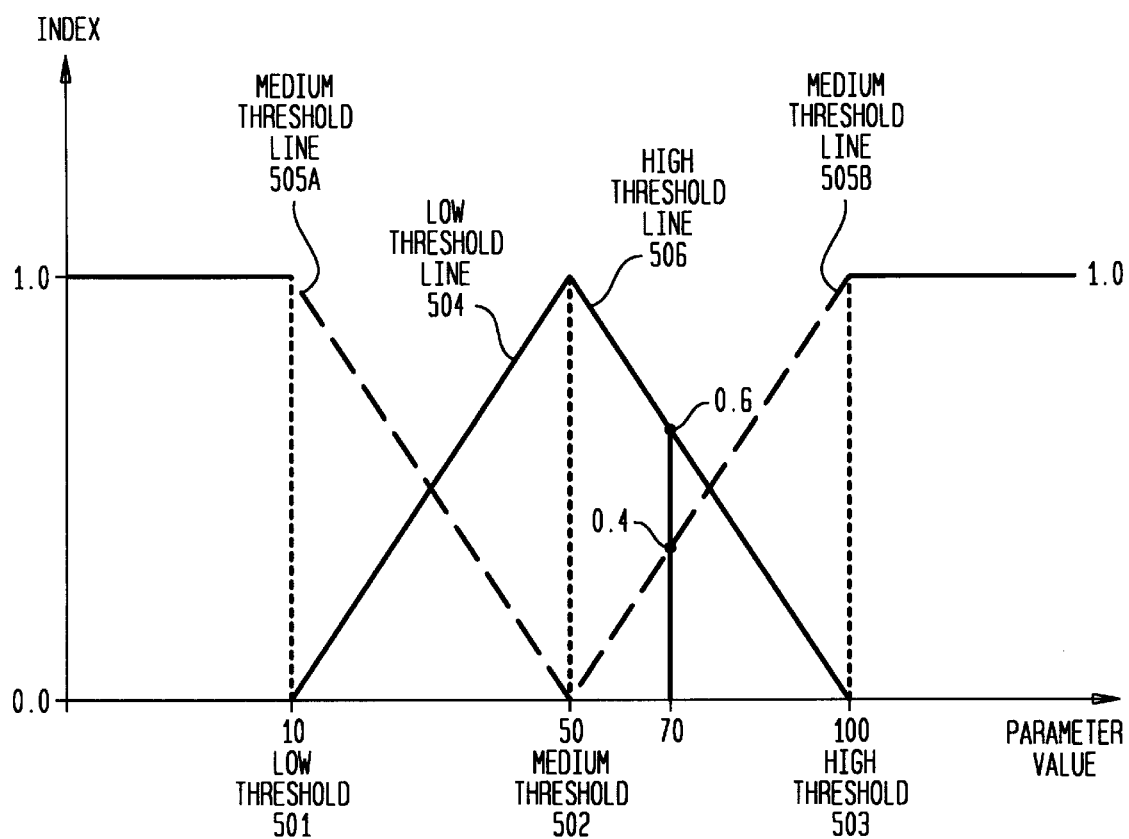
FIG. 5A is a diagram depicting an exemplary parameterization method showing the relationship between parameter data and a state index.

FIG. 5A shows one parameterization method of the present invention by which data received through network manager 215 may be translated into a state index. As shown in the FIG. 5A, the exemplary state index may assume a value preferably in a range between 0 and 1, inclusively. Other standardized ranges may be used for the purpose of presenting the network administrator with a single grading scale to be interpreted. Thus, the network administrator needs to become familiar with only one index range for many different types of network entities. An expert in the field of the network entity may determine various thresholds, such as a low 501, medium 502 and high 503 threshold for a value of the identified parameter which is to be measured for this network entity. Low 504, medium 505, and high 506 threshold lines determine what the value of the state index will be for the various states (high, medium and low).

For example, if the parameter to be measured in FIG. 5A is the error rate of the measured network entity, an expert may determine that an error rate of 10 is a low threshold, a rate of 50 is a medium threshold, and a rate of 100 is a high threshold. If the measured value of the error rate through network management program 101 is 70, the indices for the various states would be determined according to where the value intersected with the threshold lines 504–506, as shown in FIG. 5A. In this example, the value 70 intersects with the medium threshold line at 0.4; thus the "medium" error rate index for the network entity is 0.4.

Similarly, the "high" error rate index has a value of 0.6. In this example, the value of the "low" error rate index is 0.0 because the value 70 does not intersect the low threshold line 504 at any point. If for instance the parameter value was 120, the indices for high, medium, and low levels would be 1.0, 0.0, and 0.0, respectively. Note that a parameter value of 120 does not yield intersections with the medium and low threshold lines. The value 0.6 for the "high" error rate index may be interpreted as being a high probability that the network entity is experiencing a problem with regard to error rate. Note that these indices may be determined empirically as well. It should also be noted that any of indices and thresholds may be implemented.

Figure 5B:
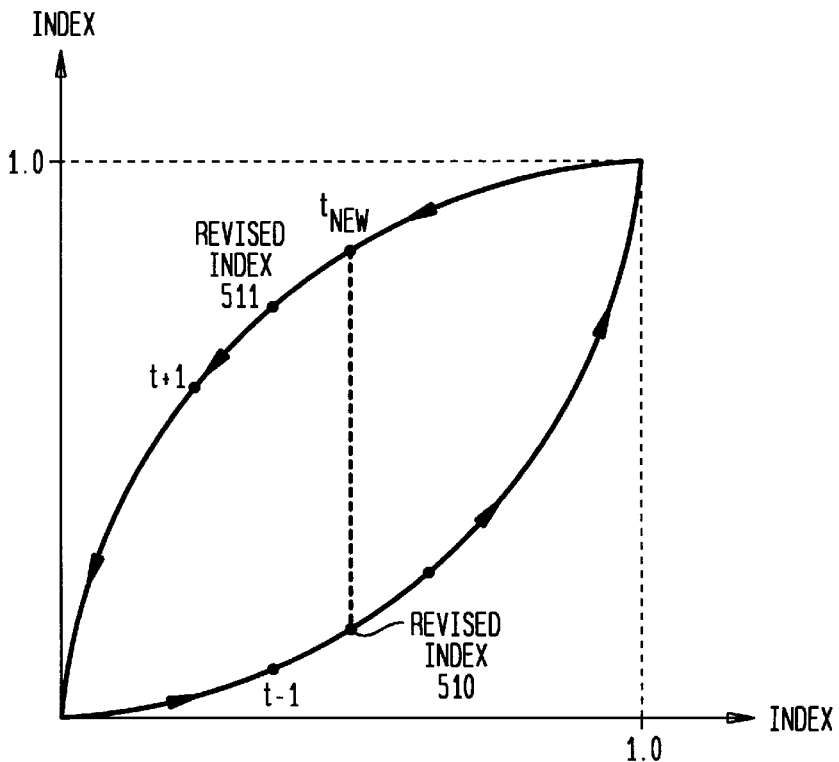
FIG. 5B is a diagram showing one approach to revising state indices over time.

FIG. 5B shows an embodiment of the present invention that changes state indices over time. The state processor 253 may compute a new index based upon the old index and a new index as described below with reference to FIGS. 6C–6D and a numeric example. As shown in FIG. 5B, the state processor 253 achieves an asymmetrical memory effect whereby a high index will rise faster than it falls, that is, indices that are increasing will be determined along the lower curve, and indices that are decreasing will be determined along the upper curve. In this manner, indices tend to retain their high values. This approach may be advantageous in certain circumstances. A system having such a response will not hide intermittent problems which produce a high index for a short period of time. It should be understood that the response may be adjusted according to the degree of memory effect desired.

Figure 6A:
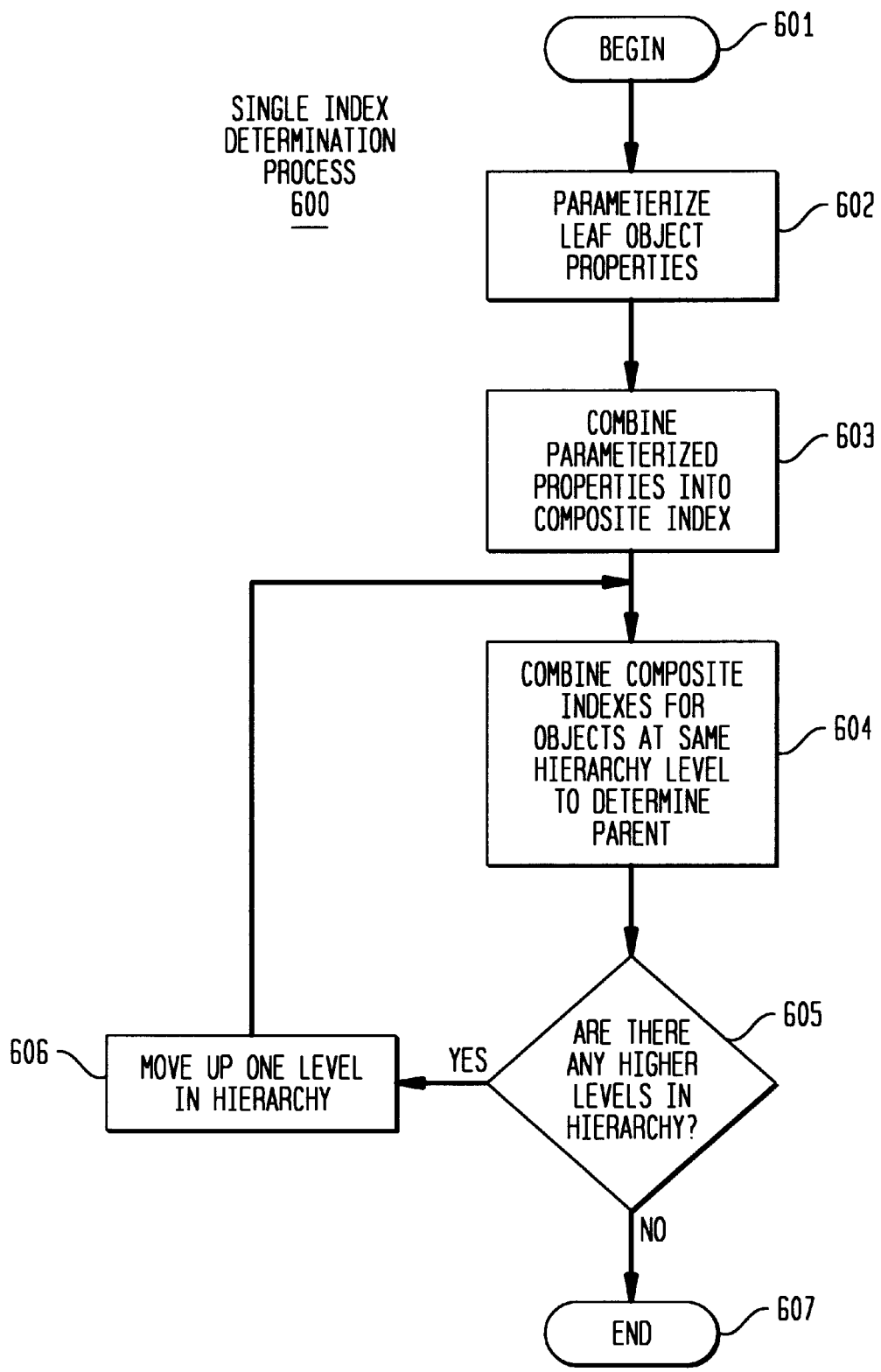

The process performed by one embodiment of the present invention will now be described with reference to the flow chart illustrated in FIG. 6A. The index determination process 600 determines a single composite index for network objects in a hierarchical tree. The index determination process 600 may be performed on a network management station 101 or network entity 211 by either data correlator 219, 229. The process begins at block 601, where a hierarchical structure is made available to the index determination process 600. At block 602, data correlator 219 parameterizes leaf object properties, such as processor utilization. Data correlator 219 may parameterize properties according to an expert judgement as discussed above with reference to FIG. 5A. As noted, different objects are represented by different sets of object properties. The object properties have a predetermined value of any number, depending on the property being measured. Thus, a mapping function is provided for each property that converts the property value into a index that may easily be compared to an index for another object. In a preferred embodiment of the present invention, the index represents a parameterized value in the range from 0 to 1 inclusively.

For example, if the network object is a NetWare server and the property being measured is processor utilization, the processor utilization property may have a value from 0 to 100%. When the processor utilization property is parameterized, a 0% utilization property value will correspond to an index with a value of 0. If the processor utilization is 100%, the associated index for the processor utilization will be a value of 1. Therefore, if the mapping between the utilization and the index is linear, a processor utilization of 75% will correspond to a processor utilization index of 0.75. According to FIG. 5A, these maximum and minimum values may be set in such a manner that below a particular parameter value, the index may be "0" and above a certain parameter value, the index may be "1".

At block 603, parameterized properties of an object are combined into a composite index for that object. The composite index represents a higher level property of the object. In the above example, the health index of a NetWare server is a higher level property of the NetWare server object. Contributing to the health of a NetWare server object may be many lower level properties such as processor utilization and percentage of file cash misses. These and other properties are known in the art of determining NetWare server performance. In a preferred embodiment of the present invention, the contributing parameterized properties are combined in such a manner that the resultant composite index is also in the range from 0 to 1 inclusively. Advantageously, a network administrator is presented with an index between 0 and 1; hence, the network administrator does not need to remember particular ranges and values for the object property. The parameterized properties may be weighted. That is, certain parameterized properties may contribute more weight to a composite index for a particular object. Such weight values may also be determined by an expert in the field.

At block 604, composite indices for network objects at the same hierarchy level in the object hierarchy 301 are combined to determine a composite index for a parent node. Referring to FIG. 3, composite indices for the leaf objects 307–310 would be combined to determine the composite index of the parent container object 304B. The composite indices for the leaf objects 307–310 would be combined and normalized; that is, the resultant composite index for container object 304B would be in the range from 0 to 1, inclusively. Thus, the composite index of a parent node may depend on the composite indices of the child objects.

It is noted that objects at the same level in the object hierarchy 301 may be different. Referring to FIG. 3, an NDS container object such as organization object 304B may contain a server object 307, a user object 308, a printer object 309, a volume object 301, or any number of other leaf objects. In FIG. 3, a health index for server object 307, a health index for user object 308, a health index for printer object 309, and a health index for the volume object 310 may be determined. Although health indices for each individual leaf object are computed differently, the health indices may represent the same general property, such as a "health" property. Hence, the indices for the individual leaf objects may be combined to form a composite index for container object 304B. For example, a health index of a server object 307 may be combined with a health index of a printer object 309 along with other objects to form an overall health index for organizational object 304B. Although the health indices are determined differently for a printer 309 and a server 307, their health indices may be combined to form a health index of their organizational object 304B, since each of the health indices have a standardized range. Further, the health index of the organizational element has the same standardized range.

At block 605, the data correlator 219 determines whether there are any higher levels in the object hierarchy 301. If so, the data correlator 219 moves up one level in the hierarchy at block 606. Control is transferred to block 604, whereat composite indices are combined to determine a composite index for a parent object. Indices are continually combined in this manner until, at block 605 it is determined that there are no higher levels in the object hierarchy 301; that is, the composite index for the root object 302 has been determined. At this time, the index determination process 600 ends at block 607.

Figure 6B:
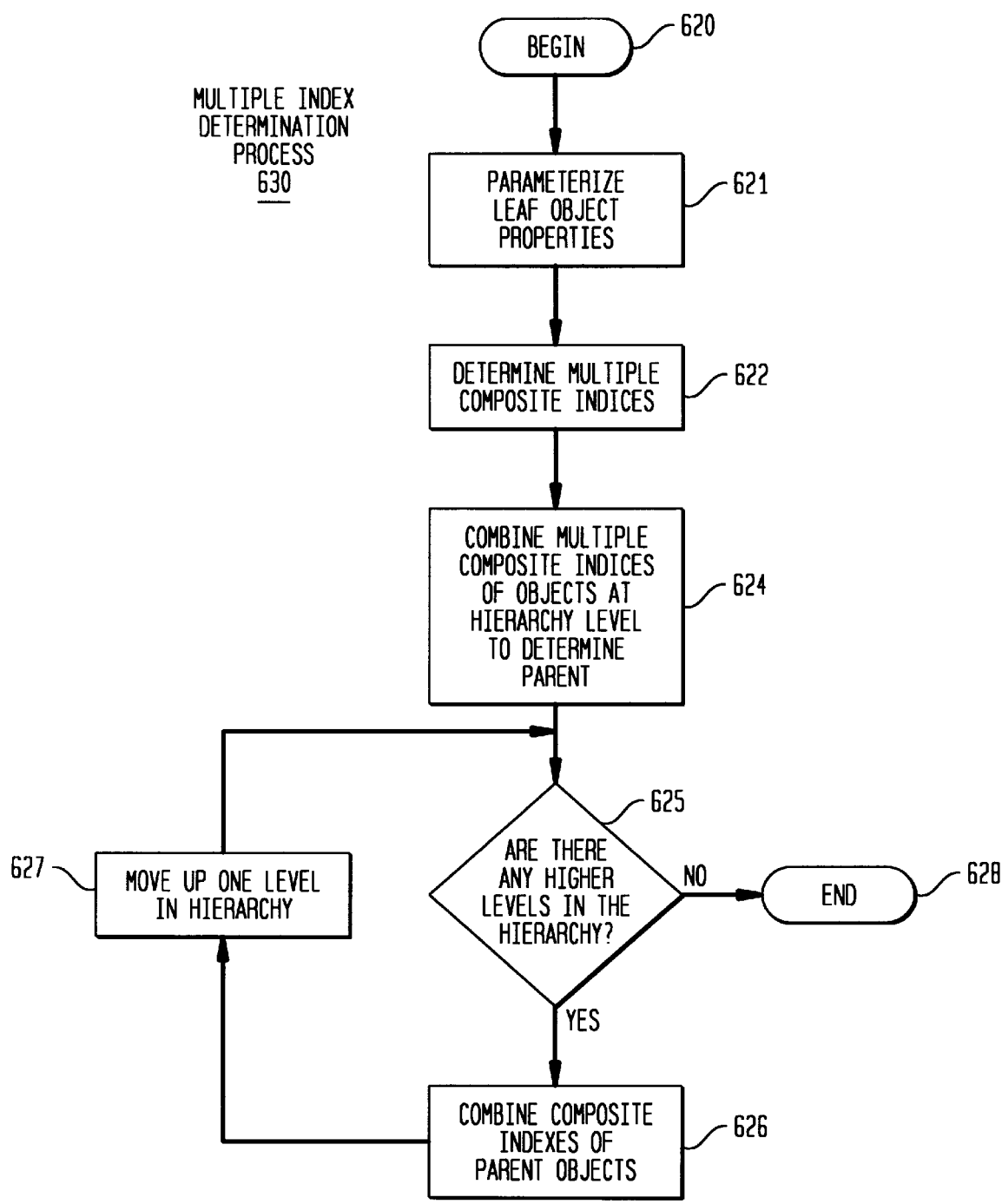

In addition to an overall health index that may be computed for an object, there may be multiple composite indices associated with an object. FIG. 6B shows one embodiment of a process for determining multiple composite indices for objects in an object hierarchy. The data correlator 219 determines multiple composite indices for an object and, based upon multiple indices for a peer object at the same level in the object hierarchy, determines multiple composite indices for a parent object. Process 630 begins at block 620, wherein an object hierarchy 301 is made available to the data correlator 219, 229.

At block 621, the data correlator 219 parameterizes leaf properties in a manner similar to that described above with respect to block 602. At block 622, data correlator 219 determines multiple composite indices based upon the parameterized properties. For example, an NDS object such as a NetWare server may contain multiple composite indices such as a health index, a sickness index, a busyness index, and the like. The health index may be determined from a different set of object properties than the sick index, or the parameterized property values may be combined in a different manner. In accordance with an alternative embodiment of the present invention, these composite indices may be combined into a single state index. Although different, the multiple composite indices may be combined according to an expert judgment to represent one state index for an object. In a preferred embodiment, the single state index would assume a value having the same range as the multiple composite indices. In the example noted above, this range is from 0 to 1 inclusively.

At block 624, multiple composite indices for all the objects at a hierarchy level are combined to determine analogous composite indices for a parent node of the child objects. More specifically, an individual index of the same type for one object is combined with a corresponding index of other objects at the same level. For example, a high busyness index of one object may be combined with the high busyness indices of other objects at the same hierarchical level. The medium and low busyness indices would be combined with those of other objects in the same manner. In an alternative embodiment, the multiple composite indices may be combined into a single state index for the object at this block as well.

If, at block 625, the data correlator 219 determines that there are higher levels in the object hierarchy 301, the composite indices of the parent objects determined at block 624 are combined to determine the composite indices of the parents at the next level higher in the hierarchy. At block 627, data correlator 219 moves up one level in the hierarchy 301. If, at block 625, there are no higher levels in the object hierarchy 301, the multiple index determination process 630 will end at block 628. At the completion of block 628, a composite index 302 has been determined for the root object of the object hierarchy 301. Significantly, the composite index of the root object 302 represents a combination of indices of objects below the root object 302 in the object hierarchy 301. This composite index of the root object 302 may be used by the network administrator to assess the indices of objects below the root object 302.

Figure 6D:
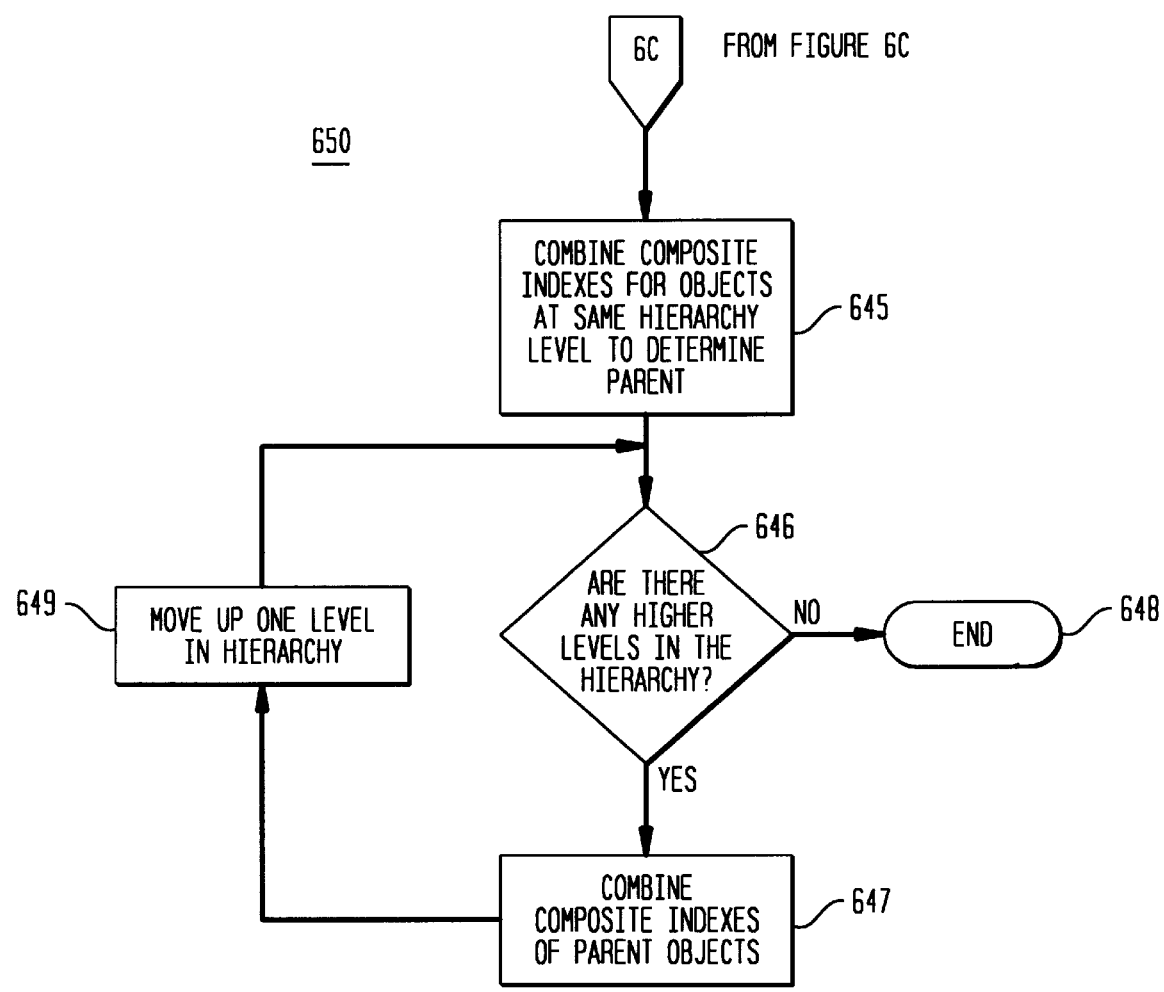

FIGS. 6C and 6D show one embodiment of a process for determining composite indices at different moments in time, referred to in the following description as time T and time T+ΔT. In process 650, a new composite index is determined based on a past value of the composite index and the current calculation of the composite index. Significantly, a memory effect can be created that will dampen the response of the composite index to abrupt changes in the object property values. Over time, the composite index may stabilize to a different value, if the particular value is sustained for enough samples. The number of samples required to change the new composite index to a particular value is determinant of the function used to determine the new composite index and its response characteristics.

At block 640, the iterative index determination process 650 is started. At block 641, leaf object properties are parameterized at a time T in a manner similar to that described above with respect to block 602. At block 642, the parameterized properties are combined into a composite index similar to block 603. After a change in time, ΔT, leaf object properties are parameterized again at block 643. At block 644, a new composite index is determined based on composite indices determined at times T and T+ΔT. It is noted that process 650 may be adapted to store any number of past samples of leaf object properties and composite indices to determine a new composite index.

At block 645, composite indices are combined for objects at the same level of hierarchy to determine the composite index for the parent object. If, at block 646, it is determined that there are no higher levels in the object hierarchy 301, process 650 ends at block 648. If there are higher levels in the object hierarchy 301, composite indices of parent objects are combined to determine the composite indices of parent objects at the next level in the object hierarchy 301 at block 647. At block 649, the process 650 advances up one level in the object hierarchy 301.

As discussed above, parameterized properties of an object may be combined into a composite index for an object, wherein the composite index is a higher level property of the object. Parameterized properties may be combined in different ways, according to an expert in the field of the managed object. The method by which the parameterized values are combined could include:

1) Arithmetic average—wherein parameterized property values are averaged to determine an overall average value. For example, parameterized values may contribute equally to a composite index for an object, such as in the case when an overall rate is determined from the rate of network information packets for several different interfaces of a network router object. Take, for example, three interfaces. The individual interfaces have the following packet rates:

Interface 1: 1000 packets/sec
Interface 2: 2000 packets/sec
Interface 3: 3500 packets/sec Also, the interfaces have the following maximum packet rates:

Interface 1: 10,000 packets/sec
Interface 2: 15,000 packets/sec
Interface 3: 7,000 packets/sec The combination of actual packet rates and theoretical maximum packet rates might yield parameterized indices of:

Interface 1: (1000 packets/sec/10,000 packets/sec)=0.1

Interface 2: (2000 packets/sec/15,000 packets/sec)= 0.1333

Interface 3: (3500 packets/sec/7000 packets/sec)=0.5

An arithmetic average of these indices would yield a composite index of:

$$\text{Composite Index} = (0.1 + 0.1333 + 0.5)/\text{number of interfaces}$$
$$= (0.1 + 0.1333 + 0.5)/3$$
$$= 0.24$$

The composite index may be used as a health indicator for the possible health of all network interface input utilizations for the router object. However, the composite index calculated previously may not be indicative of a health index for the router packet rate, since each interface has different theoretical maximum rates. A router packet rate health index might be better suited to a weighted distribution.

2) Weighted distribution—wherein parameterized indices are weighted and arithmetically combined. For example, in the example above, a router packet rate health index might be determined according to the following:

Weight for Interface X:
(Interface maximum throughput)/(Sum of maximum throughputs of all interfaces)

Weight for Interface 1: (10,000 packets/sec)/(32,000 packets/sec)=0.3125

Weight for Interface 2: (15,000 packets/sec)/(32,000 packets/sec)=0.4688

Weight for Interface 3: (7,000 packets/sec)/(32,000 packets/sec)=0.2187

Composite Index=(0.3125)(0.1)+(0.468)(0.1333)+ (0.2187)(0.5)=0.3125+0.06249+0.10935=0.2031

In the case of determining the router packet health rate index, the composite index determined is more indicative of the overall router packet rate. A router packet health rate index of 0.2031 might indicate that a router is operation at approximately 20% of its theoretical limit.

3) Non-linear approximation—wherein the response is adjusted according to a desired response for a particular composite index. For example, if an expert in the field of NetWare server performance states that the overall health index for a NetWare Server should correspond to the processor utilization unless the number of cache misses exceeds a certain number, the response would be non-linear. It should be understood that the method of combining parameterized values may take many forms, and the examples presented herein should not be considered limiting.

Multiple composite indices may be presented to the user as a single state index. In an alternative embodiment, multiple composite indices may be combined into a single state index. As discussed above, a composite index may be determined as a non-linear approximation. Likewise, multiple composite indices may be combined in the same manner. For example, the sickness index may be given a higher precedence than the busyness index and the health index. In this example, if the sickness index has a value greater than 0.5, then the state index is the sickness index with the same probability value. Otherwise, if the busyness index is greater than 0.5, then the state index is made equal to the busyness index with a value of the busyness index. If neither sickness and busyness indices are greater than 0.5, then the state index value is made equal to a value of the health index. Hence, in the hierarchy tree, each parent node and each object contains a state index with a numeric value. Multiple composite indices may also be combined by arithmetic average, weighting, or other method as deemed appropriate by an expert in the field of the managed object.

Iterative samples conducted over time may be combined using any of the above methods. Other methods may be used to determine a new value for a composite index. In an embodiment of the invention, the next composite index is increased by a first fraction of a difference between squares of the composite index and the newer composite index if the newer composite index has a greater value than the composite index. The next composite index is decreased by a second fraction of the difference between squares of the composite index and the newer composite index if the newer composite index has a lesser value than the composite index. Also, the first fraction may be greater than the second fraction, providing a rising response in the composite index that is faster than a proportional falling response in the composite index.

For example, the measurements in time for a composite index could be determined from a falling response in composite index value at time T of 0.7 and a composite index at time T+ΔT of 0.5 as follows:

$$INDEX_{NEW} = \left(1 - \sqrt{(1-Y_1)}\right)$$

Where $Y_1 = Y_2 - (1-Y_3)(Y_2-Y_3)(0.1)$ and where $Y_2 = 1 - (1 - INDEX_T)^2$ and $Y_3 = 1 - (1 - INDEX_{T+\Delta T})^2$ For $INDEX_T = 0.7$ and $INDEX_{T+\Delta T} = 0.5$, $Y_2 = 0.91$ and $Y_3 = 0.75$, thus $Y_1 = 0.91 - (1 - 0.75)(0.91 - 0.75)(0.1)$ $Y_1 = 0.906$ $INDEX_{NEW} = 0.693$ Thus, in the example, if the previous calculated value of the index were 0.7, and the new calculated value of the index were 0.5, the next value for the composite index would be 0.693. Significantly, the present invention provides a smooth response from one sampled index to another, avoiding spurious alarms for indices which have dynamic responses. That is, indices that fluctuate in value because the parameterized property values on which the index is based also fluctuate in value. Eventually, as an index value assumes a consistent value, the new value will gradually converge to the consistent value.

For a rising response in composite index, that is, a rise in value from a lower index to a higher index, another equation may be used. For example, the measurements in time for a composite index could be determined from a composite index at time T of 0.5 and a composite index at time T+ΔT of 0.7 as follows:

$$INDEX_{NEW} = \sqrt{(Y_1)}$$

Where $Y_1 = Y_2 + (1-Y_2)(Y_3-Y_2)$ and where $Y_2 = INDEX_T^2$ and $Y_3 = INDEX_{T+\Delta T}^2$ For $INDEX_T = 0.5$ and $INDEX_{T+\Delta T} = 0.7$, $Y_2 = 0.25$ and $Y_3 = 0.49$, thus $Y_1 = 0.25 + (1 - 0.25)(0.49 - 0.25)$ $Y_1 = 0.43$ -continued $$INDEX_{NEW} = 0.656$$

Note that a rise in composite index value produces a faster response than a proportional decrease in the composite index value. Such a complex response would be desired by a network administrator, since a faster response for a rising index value would be desired, yet a singular sample with a high index value may not trigger an error. In the event of a decrease in value, it would take a number of consecutive low samples to reduce a high index value significantly. It should be understood that there are many methods for producing a response for an object property, and the example described herein should not be considered limiting.

Figure 7B:
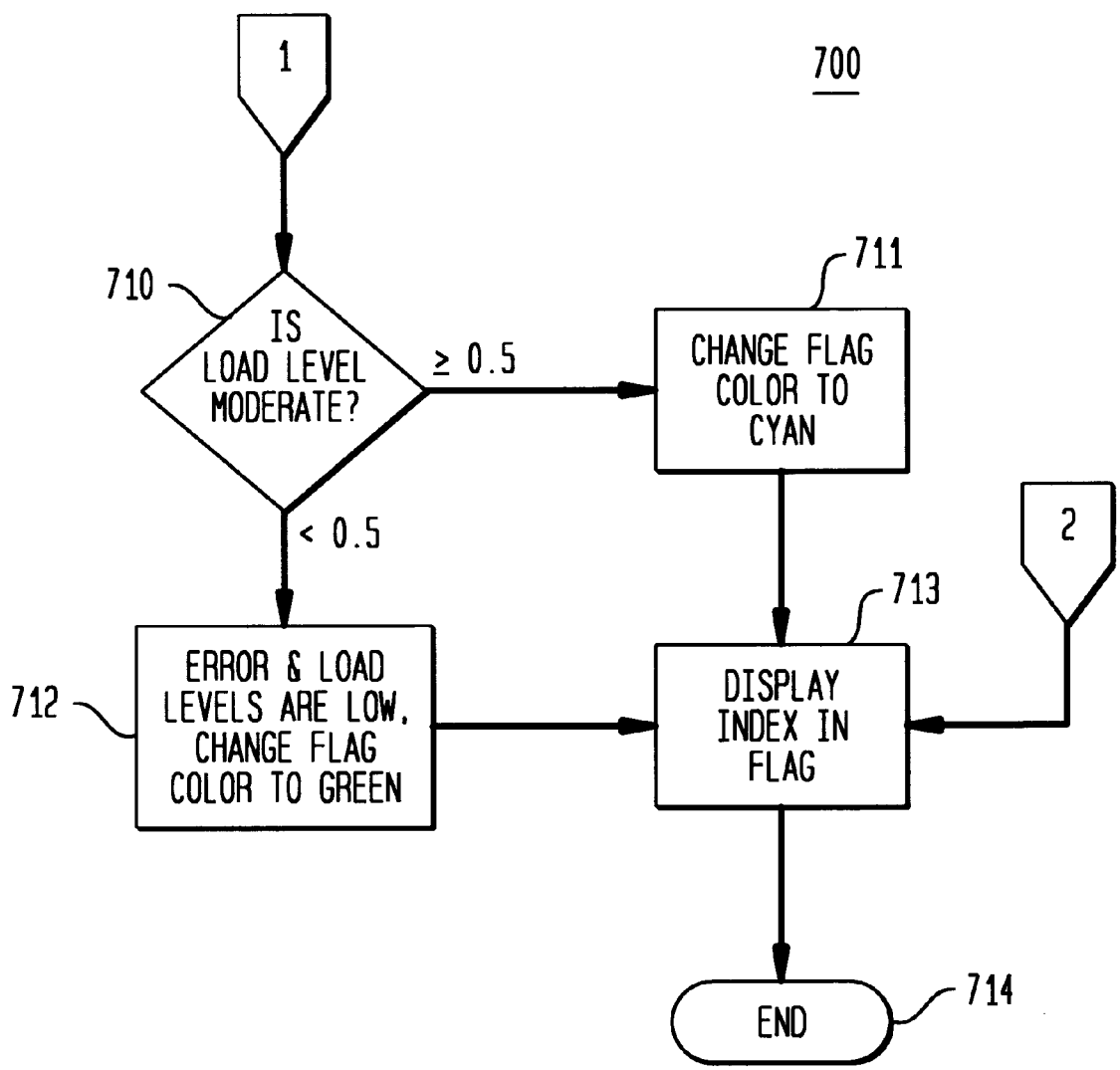

FIGS. 7A–7B are a flow chart of one embodiment of a process 700 by which an embodiment of the invention generates visual indicators based upon the index values of the object. The process will be described with reference to determining the color of the flags shown in FIG. 4. In this embodiment, two sets of composite indices, "load level" and "error rate" indices are used to determine the flag color, and the index displayed within the flag. Note that since two index types are used, six indices will be considered. Specifically, the load level will have three indices, a high, medium, and low index as described above with reference to FIG. 5A. Also, the error rate would have a high, medium, and low index. At block 701, process 700 begins. In one preferred embodiment, process 700 is performed by data correlator 219, 229. At block 702, data correlator 219, 229 determines if the network entity in question is dead, that is, the network entity was previously reachable through network management and is now unreachable. Unreachability is determined when a device does not respond to network management requests. If so, the associated flag color is changed to red at block 703. A red flag may indicate that the network entity is experiencing one or more critical problems which may result in a loss of network service.

If, at block 704, it is determined that the error level in the network entity is high, the flag color is changed to magenta at block 705. In the illustrative example described above, the network level is determined to be high when the entity's high error index has value greater than or equal to 0.5. If, at block 706, the load level in the network entity is 16 determined to be high, the flag color is changed to blue at block 707. The load level is determined to be high when the entity's high load index has a value greater than or equal to 0.5. If, at block 708, data correlator 219 determines that the error level in the network entity is moderate, data correlator 219 changes the flag color to yellow at block 709. The load level is determined to be moderate when the entity's medium load index has a value greater than or equal to 0.5. If, at block 710, data correlator 219 determines that the error level in the network entity is moderate, data correlator 219 changes the flag color to cyan at block 711. At block 712, data correlator 219 determines that error and load levels are low and changes the flag color to green. Because load and error rate levels are not high, low levels are assumed at block 712. At block 713, the index which determines the flag color is displayed to the network administrator. For example, if the high load level is index 0.9, the flag color will be changed to blue at block 707, and the high load level index (0.9) will be displayed in the flag.

In the example the colors may indicate the following:

The red color indicates that the network entity is unreachable.

The magenta color may indicate that the network entity has a high sickness level or the "high error" state index is greater than 0.5.

The blue color may indicate that the network entity has a high busyness level or the "high load" state index is greater than 0.5.

The yellow color may indicate that the network entity has a moderate level of sickness or the "medium error" state index is greater than 0.5.

The cyan color may indicate that the network entity has a moderate level of busyness or the "medium load" state index is greater than 0.5.

The green color may indicate that the network entity is operating normally or both the "low load" and "low error" state indices are greater than 0.5.

The network administrator may interpret these colors, along with the index displayed in the flag, to determine the state of the object. In another embodiment, a white color may be used to indicate that data is not yet available from the network entity, and thus an index or other flag color may not be determined.

A network administrator discovers problems with objects based on one or more composite index values determined through the procedures outlined above. For example, a network administrator observes a network management station interface 401 to locate a source of a problem. If, for instance, the health index of a server object named "SJF-IBM-PS2" of FIG. 4 had a high health index value of 0.74 and a flag having a magenta color, a network administrator would want to discover the object below the server level which was contributing to the high error index value. The network administrator would then expand the server object through the network management station interface 401 by using a pointing device, such as a mouse, or other selection method as known in the art. When the server object is expanded, child objects are displayed with their respective health indices and colors. The most problematic object is the object with the most severe color state and highest composite index.

Because the network administrator may determine the most problematic objects based on a color and index value, the most problematic object may be easily located through a discovery procedure of selecting and expanding objects.

This discovery procedure is repeated by the network administrator until the object that contributes most to the problem is determined. In a perfectly healthy network, all objects should be flagged with the green color. The most problematic network entity has the highest order of color with the largest degree of certainty. For instance, the magenta flag with 0.8 degree of certainty should investigated before the blue flag with 0.95 degree of certainty. The magenta flag takes precedence over the blue color, even though the degree of certainty for the magenta color is lower than blue.

Although this invention generally describes a method for managing objects such as network entities in a network management program, it is understood that these methods could be easily adapted for use with any management method of objects or physical entities in a system.

While various embodiments of the present invention have been described above, it should be understood that they have been presented by way of example only, and not limitation. For example, as used herein, the term "objects" has been used to refer to servers and other hardware-based components. However, as one skilled in the relevant art would find apparent, other entities may be objects, such as software applications running on a server. Also, the present invention may be used with any hierarchical database structure having a parent-sibling relationship between elements or objects. For example, the present invention may be used in conjunction with the Poet database which includes network entities created in compliance with the CIM schema from Microsoft Corporation. Thus, the breadth and the scope of the present invention are not limited by any of the above-described exemplary embodiments, but are defined only in accordance with the following claims and their equivalents.

What is claimed is:

1. A method for managing a plurality of objects arranged in a hierarchical structure, the method comprising the steps of:

a) combining a first and a second parameterized property both associated with a first object in accordance with a first predetermined manner to form a composite index of the first object, wherein the composite index represents a relative health of the first object and has a standardized value range;

b) combining a third and a fourth parameterized property both associated with a second object in accordance with a second predetermined manner to form a composite index of the second object wherein the composite index of the second object represents a relative health of the second object and has a same standardized value range; and c) combining the composite indices of the first and second objects to obtain a first parent composite index corresponding to a parent object, wherein the first and second objects are child objects of the parent object and the first parent composite index has a value range which is the same as that of the first and second object composite indices.

2. The method of claim 1, wherein the method further comprises the steps of:

d) determining a second parent composite index for the parent object; and e) combining the first and second parent composite indices into a total state index for the parent object.

3. The method of claim 2, further comprising the step of f) before said step e) weighting the first and second indices.

4. The method of claim 1, wherein the method further comprises the steps of:

d) combining the first parent composite index with other parent composite indices at a same level of the hierarchical structure, the hierarchical structure having a root object; and e) combining, for the root object, parent composite indices to obtain a final composite index, wherein the final composite index indicates a health of the hierarchical structure.

5. The method of claim 1, wherein the composite indices of the first, second, and parent objects each have a standardized range of value in the range of zero to one, inclusively.

6. The method of claim 5, wherein said step c) comprises the steps of:

1) weighting the first index by a first weighting producing a first weighted index;

2) weighting the second index by a second weighting producing a second weighted index, wherein the first weighting is different than the second weighting; and 3) arithmetically combining the first and second weighted indices.

7. The method of claim 5, further comprising the steps of:
   d) determining the composite index for the first object at one moment in time;
   e) determining a newer composite index at a later point in time; and
   f) computing a next composite index based on the composite index and the newer composite index.

8. The method of claim 7, wherein the next composite index is an arithmetic average of the composite index and the newer composite index.

9. The method of claim 7, wherein the next composite index is increased by a first fraction of a difference between squares of the composite index and the newer composite index if the newer composite index has a greater value than the composite index and wherein the next composite index is decreased by a second fraction of the difference between squares of the composite index and the newer composite index, if the newer composite index has a lesser value than the composite index.

10. The method of claim 9, wherein the first fraction is greater than the second fraction, providing a rising response that is faster than a proportional falling response.

11. The method of claim 5, wherein said step c) comprises the step of:
    1) determining the arithmetic average of the first index, second index, and other indices of objects at a same level of the hierarchial structure.

12. A system for managing a plurality of objects arranged in a hierarchical structure, the system comprising:
    means for combining a first and a second parameterized property both associated with a first object in accordance with a predetermined manner to form a composite index of the first object, wherein the composite index represents a health level of the first object and has a standardized value range;
    means for combining a third and a fourth parameterized property both associated with a second object in accordance with a second predetermined manner to form a composite index of the second object wherein the composite index of the second object represents a relative health of the second object and has a same standardized value range; and
    means for combining the composite indices of the first and second objects to obtain a first parent composite index corresponding to a parent object, wherein the first and second objects are child objects of the parent object and the parent composite index has a value range which is the same as that of the first and second object composite indices.

13. The system of claim 12, further comprising:
    means for determining a second parent composite index for the parent object; and
    means for combining the first and second parent composite indices into a total state index for the parent object.

14. The system of claim 13, wherein the first and second indices are weighted before being combined into the total state index.

15. The system of claim 12, further comprising:
    means for combining the first parent composite index with other parent composite indices at a same level of the hierarchical structure; and
    means for combining, at the top of the hierarchical structure, parent composite indices to obtain a final composite index.

16. The system of claim 12, wherein the composite indices of the first, second, and parent objects each have a standardized range of value in the range of zero to one inclusively.

17. The system of claim 16, wherein said means for combining includes:
    means for weighting the first index by a first weighting producing a first weighted index;
    means for weighting the second index by a second weighting producing a second weighted index, wherein the first weighting is different than the second weighting; and
    means for arithmetically combining the first and second weighted indices.

18. The system of claim 16, further comprising:
    means for determining the composite index for the first object at one moment in time;
    means for determining a newer composite index at a later point in time; and
    means for computing a next composite index based on the composite index and the newer composite index.

19. The system of claim 18, wherein the next composite index is an arithmetic average of the composite index and the newer composite index.

20. The system of claim 18, wherein the next composite index is increased by a first fraction of a difference between squares of the composite index and the newer composite index if the newer composite index has a greater value than the composite index and wherein the next composite index is decreased by a second fraction of the difference between squares of the composite index and the newer composite index, if the newer composite index has a lesser value than the composite index.

21. The system of claim 20, wherein the first fraction is greater than the second fraction, providing a rising response that is faster than a proportional falling response.

22. The system of claim 16, wherein said means for combining comprises:
    means for determining the arithmetic average of the first index, second index, and other indices of objects at a same level of the hierarchial structure.

23. A network management system comprising:
    a network manager operable to retrieve at least one property value from one of a plurality of agents corresponding to a first object located in a hierarchical structure;
    a data correlator constructed and arranged to compute a relative health of the object based upon the at least one property value wherein the relative health of the object is represented by a first index having a standardized value range, and wherein said data correlator is operable to combine the index with a second index for a second object to produce a composite index of a parent object, the composite index having a same standardized value range as that of the first and second indices; and
    a graphical user interface for displaying the relative health of the network management system.

24. The network management system of claim 23, wherein said data correlator includes:
    a state processor that determines a state of the object based on at least one object rule; and
    an interface processor which changes the color of an indicator based on the state of the object, the indicator being associated with the object within the graphical user interface and presenting the user with the health index of the object.

25. The network management system of claim 24, wherein said interface processor generates the indicator associated with the object, and wherein the indicator is a flag containing a value of the health index.

26. The network management system of claim 23, wherein said data correlator includes:

a state processor that determines a state of a container object based on a relative health index of at least one of a plurality of objects located at a same hierarchical level in the hierarchical structure; and an interface processor which changes the color of an indicator based on the state of the object, the indicator being associated with the container object within the graphical user interface and presenting the user with the health index of the container object.

27. The network management system of claim 26, wherein said interface processor generates the indicator associated with the object, and wherein the indicator is a flag containing a value of the health index.

28. The network management system of claim 23, wherein the first, second, and composite indices have a value in a range from 0 to 1.

29. A controller for enabling a processor to manage network objects in a hierarchical structure, said controller comprising:

a network manager for retrieving at least one property value from one of a plurality of agents corresponding to an object located in a hierarchical structure; and a data correlator for computing relative health of the object based upon the at least one property value wherein the relative health of the object is represented by a first index having a standardized value range, and for combining the index with a second index for a second object to produce a composite index of a parent object, the composite index having a standardized range that is the same as the standardized range of the first and second indices.

30. A computer program product comprising a computer readable medium having computer program logic recorder thereon for enabling a processor in a network management system to manage objects in a hierarchical structure, said computer program product comprising:

a network manager for retrieving at least one property value from one of a plurality of agents corresponding to an object located in a hierarchical structure; and a data correlator for computing relative health of the object based upon the at least one property value wherein the relative health of the object is represented by a first index having a standardized value range, and for combining the index with a second index for a second object to produce a composite index of a parent object, the composite index having a standardized range that is the same as the standardized range of the first and second indices.

* * * * *